United States Patent
Shaw et al.

(10) Patent No.: US 11,675,861 B2
(45) Date of Patent: *Jun. 13, 2023

(54) SENSORY ALLEGIANCE

(71) Applicant: AT&T Intellectual Property I, L.P., Atlanta, GA (US)

(72) Inventors: Venson Shaw, Kirkland, WA (US); Sangar Dowlatkhah, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,232

(22) Filed: Sep. 14, 2022

(65) Prior Publication Data
US 2023/0004612 A1 Jan. 5, 2023

Related U.S. Application Data

(63) Continuation of application No. 16/529,857, filed on Aug. 2, 2019, now Pat. No. 11,487,836, which is a continuation of application No. 14/887,579, filed on Oct. 20, 2015, now Pat. No. 10,417,295.

(51) Int. Cl.
| | |
|---|---|
| *G06F 16/00* | (2019.01) |
| *G06F 16/9537* | (2019.01) |
| *H04L 67/12* | (2022.01) |
| *H04M 15/00* | (2006.01) |
| *G06F 16/955* | (2019.01) |
| *H04W 4/70* | (2018.01) |
| *H04W 4/02* | (2018.01) |

(52) U.S. Cl.
CPC ........ *G06F 16/9537* (2019.01); *G06F 16/955* (2019.01); *H04L 67/12* (2013.01); *H04M 15/09* (2013.01); *H04W 4/023* (2013.01); *H04W 4/70* (2018.02)

(58) Field of Classification Search
CPC ... G06F 16/9537; G06F 16/955; H04L 67/12; H04M 15/09; H04W 4/023; H04W 4/70
See application file for complete search history.

(56) References Cited

U.S. PATENT DOCUMENTS

| | | | | |
|---|---|---|---|---|
| 8,738,925 | B1* | 5/2014 | Park | H04B 7/26 713/186 |
| 9,566,395 | B2* | 2/2017 | Denny | A61M 5/20 |
| 2010/0277315 | A1* | 11/2010 | Cohn | H04L 67/125 340/541 |
| 2014/0101578 | A1* | 4/2014 | Kwak | G06F 3/017 715/761 |
| 2014/0273960 | A1* | 9/2014 | Narendra | H04M 1/72412 455/411 |
| 2014/0273961 | A1* | 9/2014 | Narendra | H04W 12/068 455/411 |
| 2015/0084757 | A1* | 3/2015 | Annibale | H04W 4/90 340/436 |

(Continued)

*Primary Examiner* — Noosha Arjomandi
(74) *Attorney, Agent, or Firm* — Guntin & Gust, PLC; Mark Wilinski

(57) ABSTRACT

Personalized sensory services are provided to mobile devices. As a sensor monitors an area of surveillance, the sensor may detect a passing mobile device. The sensor may thus ally itself to the passing mobile device and provide personalized sensory operations.

20 Claims, 24 Drawing Sheets

(56) References Cited

U.S. PATENT DOCUMENTS

| | | | | |
|---|---|---|---|---|
| 2015/0097689 A1* | 4/2015 | Logue | ................... | H04W 4/029 |
| | | | | 340/632 |
| 2015/0251839 A1* | 9/2015 | Denny | ................... | A61B 50/30 |
| | | | | 221/3 |
| 2015/0286435 A1* | 10/2015 | Hwang | ............... | G06F 11/1458 |
| | | | | 711/162 |
| 2015/0313496 A1* | 11/2015 | Connor | ................. | A61B 5/369 |
| | | | | 600/301 |
| 2015/0341603 A1* | 11/2015 | Kasmir | .................... | H04N 5/33 |
| | | | | 340/584 |
| 2016/0093198 A1* | 3/2016 | Tung | .................. | G08B 21/0423 |
| | | | | 340/539.11 |
| 2017/0039841 A1* | 2/2017 | Wilson | ................... | G08B 25/14 |
| 2017/0076584 A1* | 3/2017 | Eskildsen | ............. | H04W 12/06 |
| 2019/0354565 A1* | 11/2019 | Shaw | ................. | G06F 16/9537 |

\* cited by examiner

SENSORY ALLEGIANCE

CROSS-REFERENCE TO RELATED APPLICATIONS

This application is a continuation of U.S. patent application Ser. No. 16/529,857 filed on Aug. 2, 2019, which is a continuation of U.S. patent application Ser. No. 14/887,579 filed on Oct. 20, 2015 (now U.S. Pat. No. 10,417,295). All sections of the aforementioned application(s) and patent(s) are incorporated herein by reference in their entirety.

BACKGROUND

Security systems are common in homes and businesses. Security systems alert occupants to intrusions. Security systems, though, may also warn of fire, water, and harmful gases.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
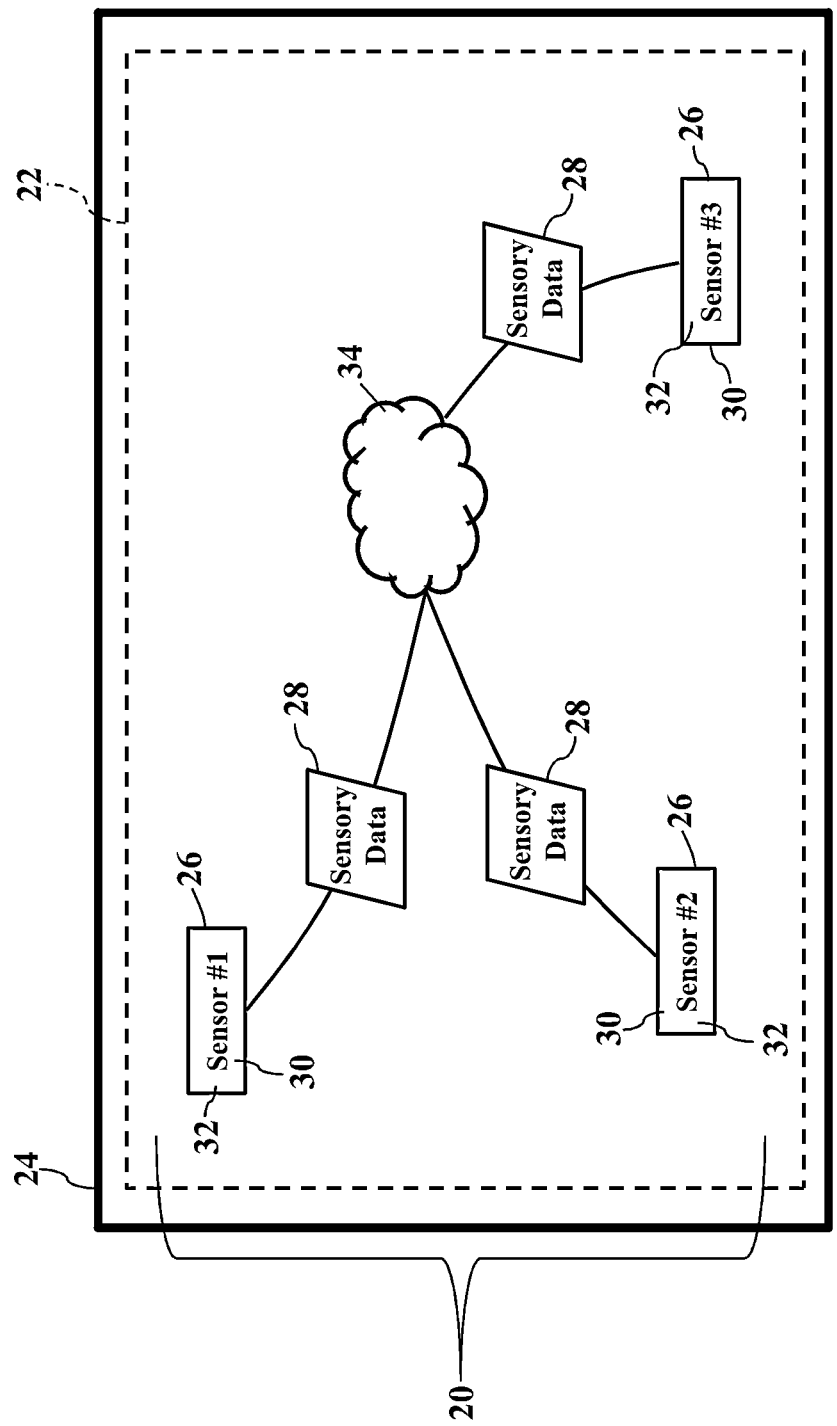
FIGS. 1-9 are simplified illustrations of an operating environment, according to exemplary embodiments.

FIGS. 1-9 are simplified illustrations of an operating environment, according to exemplary embodiments. While exemplary embodiments may be implemented in many environments, FIG. 1 illustrates a common operating environment that most readers will understand. A colony 20 of sensors monitors an area 22 of surveillance inside or outside a building 24, such as a home or business. The colony 20 of sensors may be smart components of a security system, thus protecting occupants from fire, intrusion, and other security conditions (as later paragraphs will explain). However, the colony 20 of sensors may also be the components of a home automation system (as later paragraphs will also explain). Each sensor 26 in the colony 20 of sensors may thus generate sensory data 28 in response to some measured or monitored condition 30. Here, though, the colony 20 of sensors collaborates with each other to develop high-level knowledge of the area 22 of surveillance. That is, each sensor 26 may wirelessly communicate with the other sensors 26 in the colony 20 of sensors. Each sensor 26 may have a network interface 32 to a communications network 34. Each sensor 26 in the colony 20 of sensors may thus individually share its sensory data 28 with the other sensors in the colony 20 of sensors. The colony 20 of sensors thus works together to monitor the area 22 of surveillance and to learn from each sensor's sensory data 28.

Figure 2:
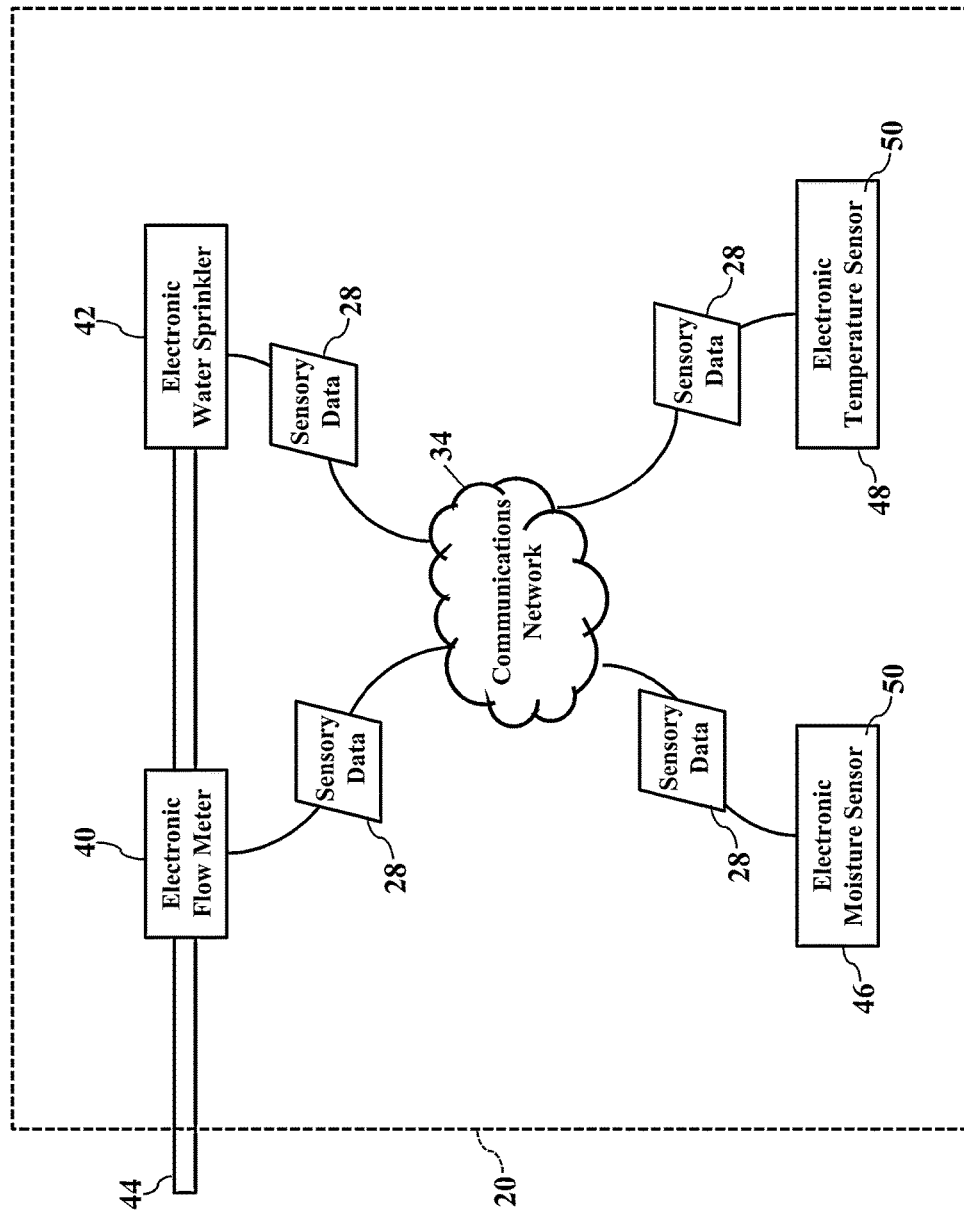

FIG. 2 illustrates an example of sensory collaboration. Suppose the colony 20 of sensors includes an electronic flow meter 40 that measures water discharged or sprayed by an electronic water sprinkler 42. The electronic flow meter 40 physically connects to a water supply line 44 and automatically opens or closes in response to the sensory data 28 generated by the colony 20 of sensors. For example, an electronic moisture sensor 46 and an electronic temperature sensor 48 provide their respective sensory data 28 to help collectively determine when irrigation should occur. The electronic temperature sensor 26 has a transducer 50 that generates an output signal in response to an ambient temperature. The electronic temperature sensor 26 wirelessly sends its sensory data 28 into the communications network 34 for receipt by the electronic flow meter 40, the electronic water sprinkler 42, and/or the electronic moisture sensor 26. Similarly, the electronic moisture sensor 26 may, likewise, wirelessly send its output signal to the electronic flow meter 40, the electronic water sprinkler 42, and/or the electronic temperature sensor 26. The colony 20 of sensors may thus intelligently collaborate to irrigate a lawn and plants. For example, when the ambient temperature equals or exceeds some threshold value, and the electronic moisture sensor 26 indicates dry conditions, the electronic flow meter 40 may open and flow water to the electronic water sprinkler 42. The colony 20 of sensors may thus irrigate grass and plants in response to the environmental conditions.

Figure 3:
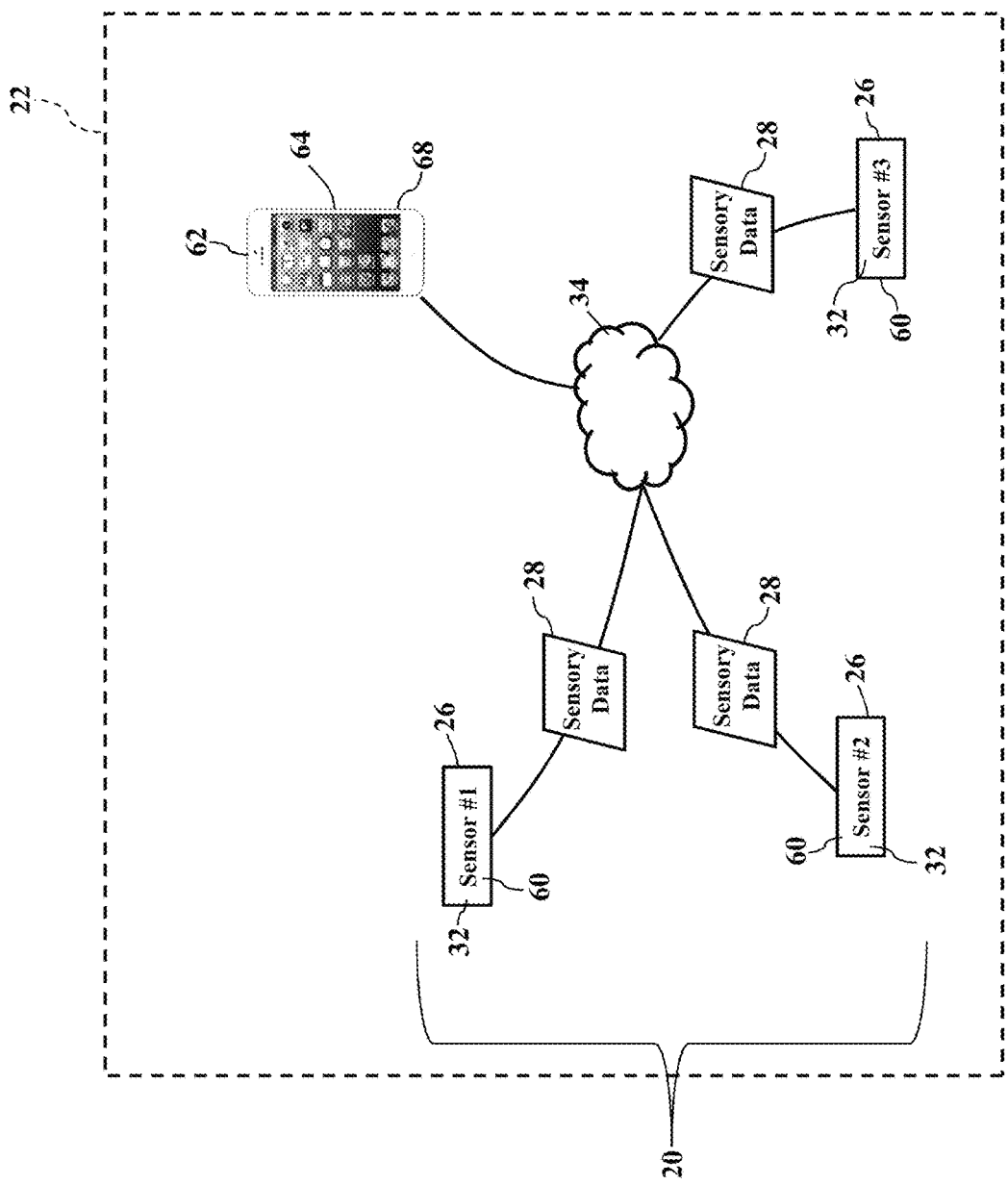

FIG. 3 further illustrates sensory collaboration. Here the colony 20 of sensors may personalize their individual operation according to an allegiance 60. The allegiance 60 governs or determines how the respective sensor 26 collaboratively operates within the colony 20 of sensors. While the allegiance 60 may be determined in many ways, FIG. 3 illustrates sensed detection of a mobile device 62. That is, suppose a user's smartphone 64 establishes communication with the colony 20 of sensors via the communications network 34. The colony 20 of sensors may thus identify the smartphone 64 and assume the corresponding allegiance 60. The colony 20 of sensors may thus implement the allegiance 60 based on a device identifier 68 associated with the smartphone 64. Once the smartphone 64 is identified, the colony 20 of sensors may query for and retrieve the corresponding allegiance 60. The allegiance 60 may thus define the operational parameters associated with the device identifier 68.

Figure 4:
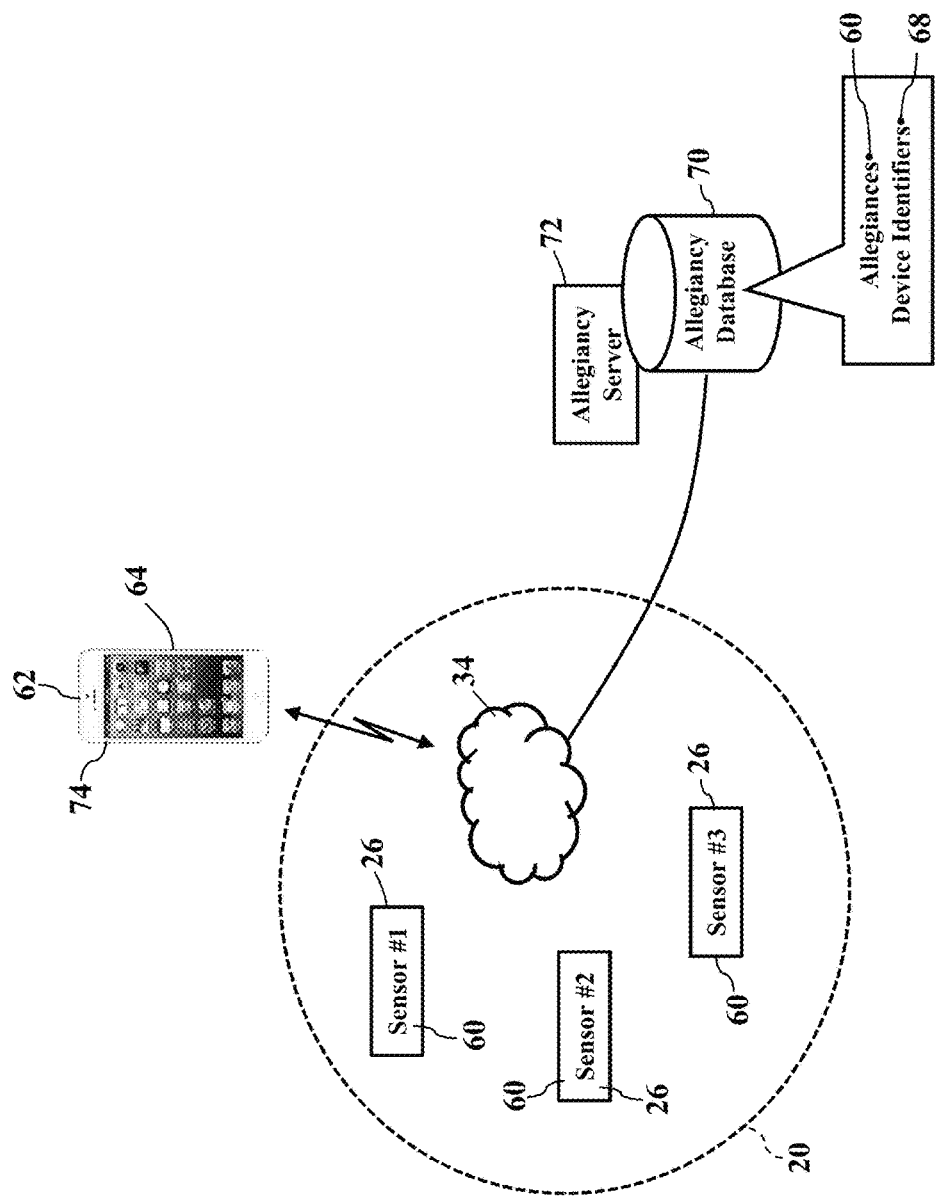

FIG. 4 illustrates an electronic allegiancy database 70. The electronic allegiancy database 70 stores different allegiances 60 in electronic database association to different device identifiers 68. While the electronic allegiancy database 70 may be locally stored in a memory of one of the sensors 26, FIG. 4 illustrates a networked allegiancy server 72. The allegiancy server 72 stores the electronic allegiancy database 70, thus providing a central repository for the different allegiances 60. Exemplary embodiments may thus query the electronic allegiancy database 70 for a query or search parameter and retrieve the corresponding allegiance 60. Suppose, for example, the colony 20 of sensors receives or determines a cellular telephone number 74 associated with the user's smartphone 64. Any sensor 26 associated with the colony 20 of sensors may thus query the electronic allegiancy database 70 for the cellular telephone number 74 and retrieve the corresponding allegiance 60. FIG. 4, for simplicity, only illustrates a single allegiance 60, yet there may be several different allegiances (such as a different allegiance 60 for each different sensor 26) associated with the colony 20 of sensors. Regardless, the colony 20 of sensors implements the allegiance 60, thus allying itself to the user's smartphone 64.

Figure 5:
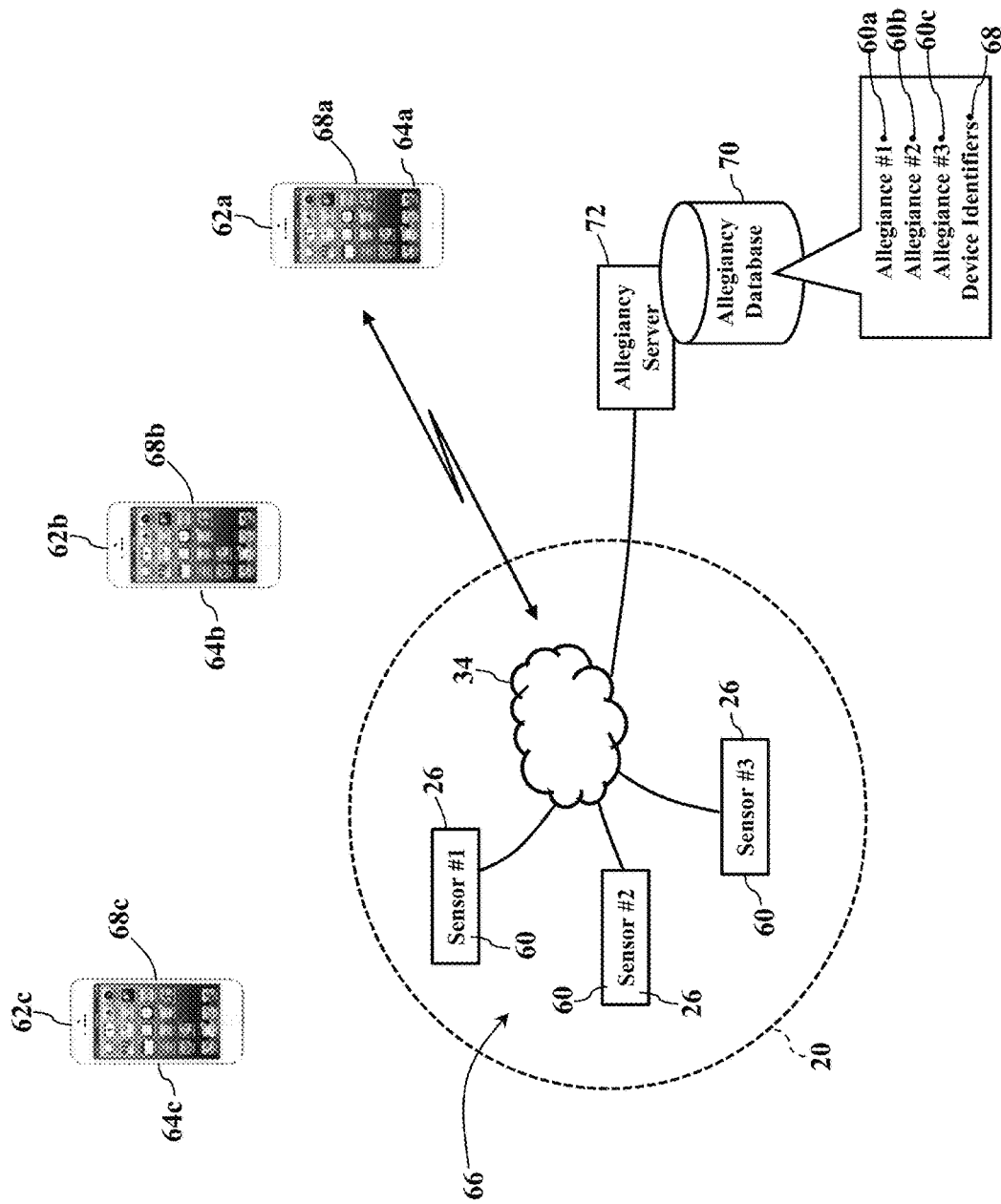

FIG. 5 illustrates temporary allegiance 60. Here the colony 20 of sensors may transiently switch their allegiance 60, based on different device identifiers 68. FIG. 5, for example, illustrates the colony 20 of sensors operating in the vicinity of different mobile devices 62a, 62b, and 62c. Whenever any mobile device 62 establishes communication with the colony 20 of sensors (via the communications network 34), exemplary embodiments may retrieve the corresponding allegiance 60. Suppose the mobile device 62a first establishes wireless communication with the colony 20 of sensors. The colony 20 of sensors identifies the passing smartphone 64a by its unique device identifier 68a, queries the electronic allegiancy database 70, and retrieves the corresponding allegiance 60. The colony 20 of sensors may thus instantaneously detect the passing smartphone 64a and synchronize to the corresponding allegiance 60. When the smartphone 64b moves into wireless range and establishes communication, the colony 20 of sensors detects the corresponding device identifier 68b and retrieves the corresponding allegiance 60. Similarly, when the smartphone 64c establishes communication, the colony 20 of sensors determines the corresponding device identifier 68c and synchronizes to the corresponding allegiance 60. The colony 20 of sensors thus personalizes its operation to the preferences, parameters, and overall allegiance 60 associated with any passing mobile device 62. The user of the passing smartphone, in other words, receives some individualized, personalized service based on transient identification of her smartphone 64.

FIG. 5 thus illustrates dynamic allegiance. As the different mobile devices 62 pass by, the colony 20 of sensors may dynamically switch its allegiance 60. An amusement park provides another familiar example. Suppose the colony 20 of sensors monitors a ride or attraction at the amusement park. As different riders file past the colony 20 of sensors, each rider's personal smartphone 64 may at least momentarily establish communication with the colony 20 of sensors (via the communications network 34). The colony 20 of sensors identifies the passing smartphone 64, queries the electronic allegiancy database 70, and retrieves the corresponding allegiance 60. The colony 20 of sensors may thus dynamically synchronize and personalize to the traits, strengths, or even fears associated with the passing smartphone 64. An operator of the ride may thus configure or tailor operational parameters to the passing rider, based on transient identification of her smartphone 64.

Exemplary embodiments thus describe knowledge-based personalized service. Each sensor 26 in the colony 20 of sensors collaborates with its sensory mates to develop a high level knowledge of a user's desires, based on the allegiance 60. As any sensor 26 in the colony 20 of sensors may instantaneously detect the user (via her mobile device 62), the colony 20 of sensors may synchronize to the electronic allegiancy database 70 and execute a personalized service tailored to the individual user.

Figure 6:
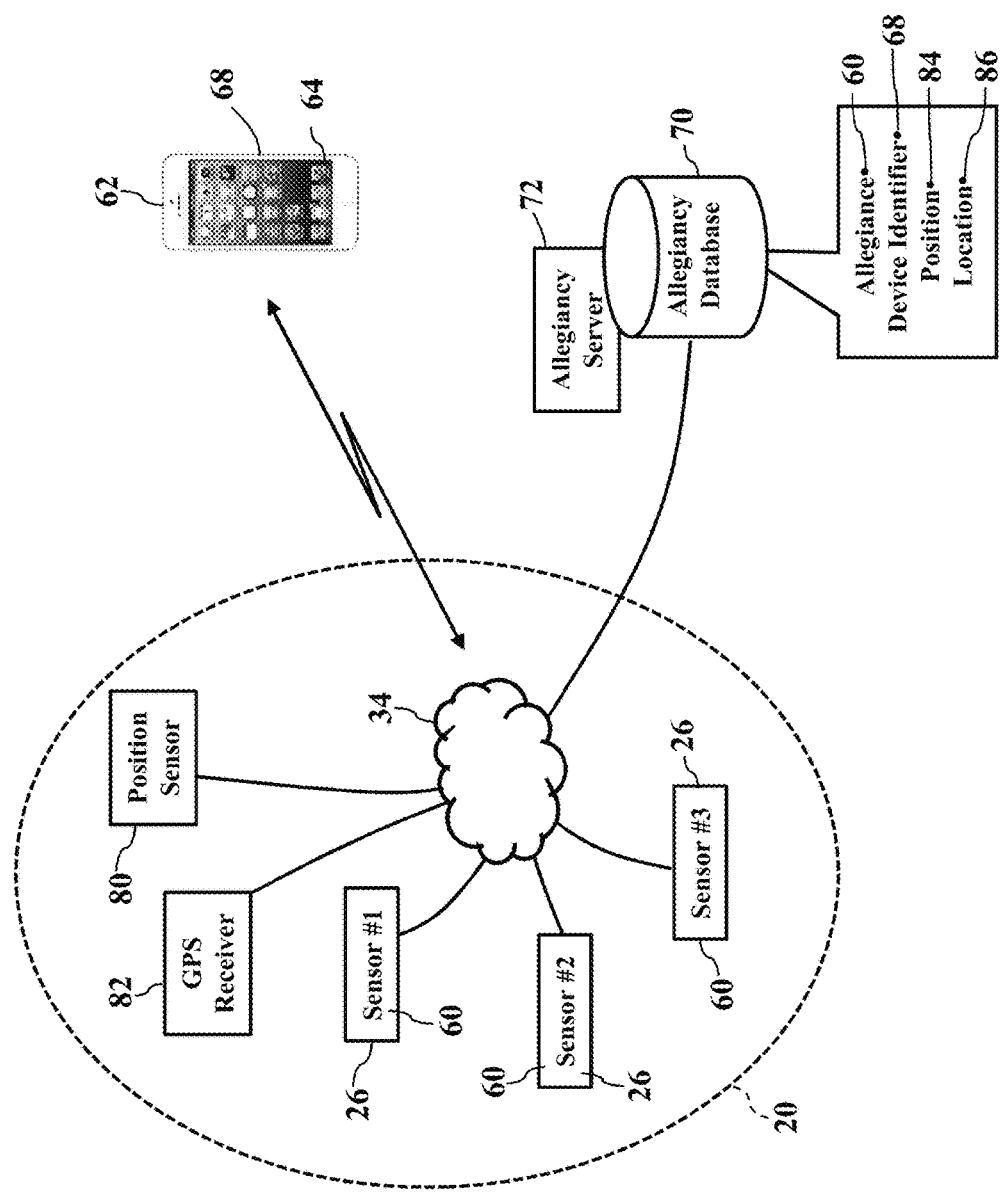

FIG. 6 further illustrates the allegiance 60. Here the colony 20 of sensors may include a position sensor 80 and a global positioning system ("GPS") receiver 82. The position sensor 80 may sense or monitor one, two, or three dimensional angular and/or radial orientation and generate an output signal. The GPS receiver 82 determines a geographical location, based on GPS signals or information. The colony 20 of sensors may thus change its allegiance 60, based on the device identifier 68, a position 84, and/or a location 86. The colony 20 of sensors may thus receive an output signal produced or generated by the position sensor 26 and/or by the GPS receiver 82. The position sensor 26 may utilize any physical, mechanical, electrical, and/or chemical means to determine the position 84 associated with any sensor 26 of the colony 20 of sensors.

Figure 7:
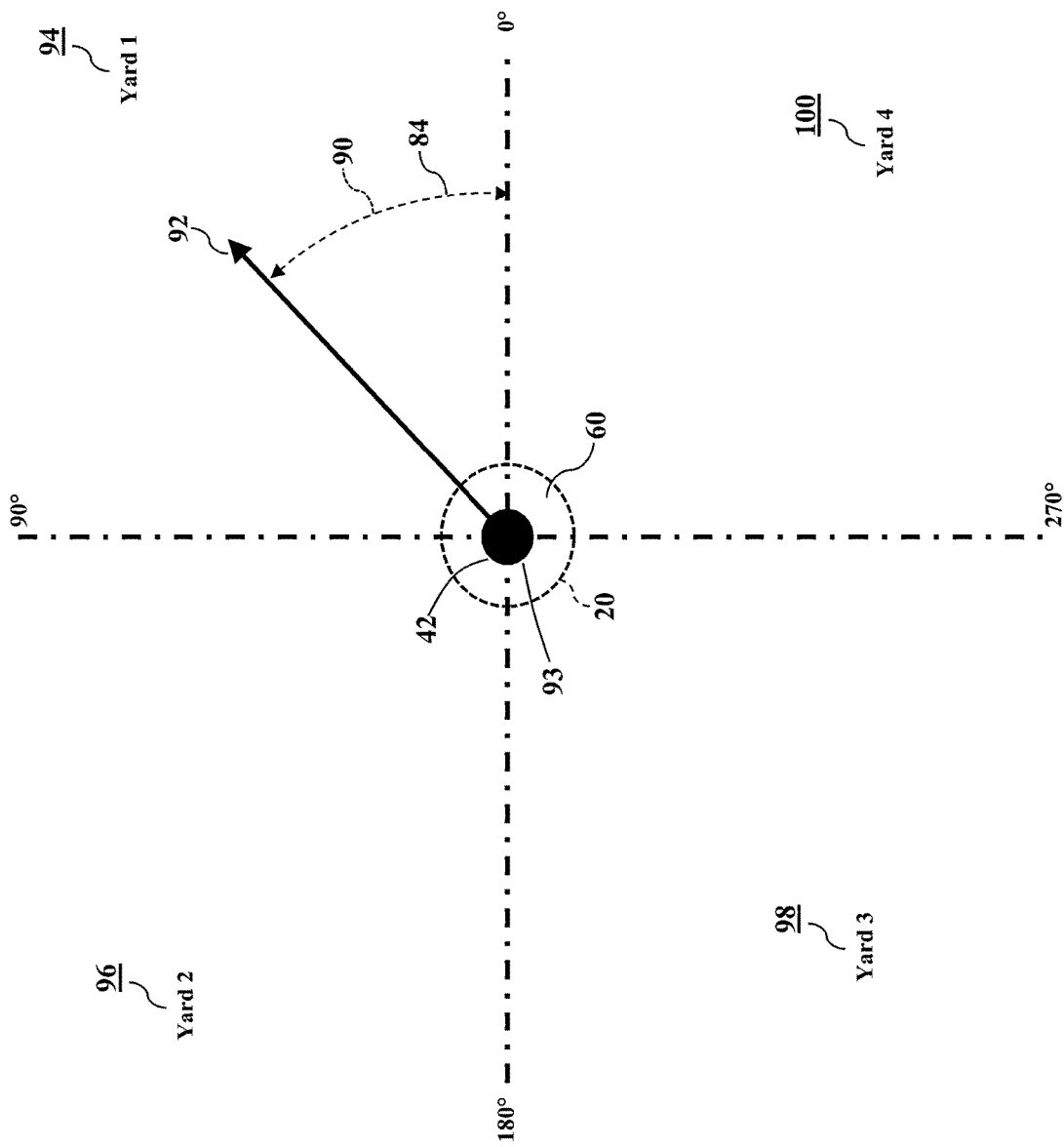

FIG. 7 illustrates positional allegiance 60. Here the colony 20 of sensors may determine its allegiance 60 based on the position 84 determined from the output signal generated by the position sensor (illustrated as reference numeral 80 in FIG. 6). For simplicity, assume the position sensor 80 determines an angular orientation 90 associated with the electronic water sprinkler 42, based on its discharge stream 92. As the electronic water sprinkler 42 rotates or spins, the colony 20 of sensors may switch its allegiance 60, based on the angular orientation 90. As FIG. 7 illustrates, also assume the electronic water sprinkler 42 may be installed at or near a corner intersection 93 of four (4) different yards (illustrated, respectively, as reference numerals 94, 96, 98, and 100). As the electronic water sprinkler 42 rotates, its discharge stream 92 may water or irrigate one (1) of the four different yards. That is, from zero (0) degrees to ninety (90) degrees, the electronic water sprinkler 42 irrigates "Yard 1" (illustrated as reference numeral 94). The electronic water sprinkler 42 irrigates "Yard 2" (illustrated as reference numeral 96) from 90 degrees to 180 degrees, "Yard 3" (illustrated as reference numeral 989) from 180 degrees to 270 degrees, and "Yard 4" (illustrated as reference numeral 100) from 270 degrees back to zero degrees. The position sensor 80 measures or determines the angular orientation 90 associated with the discharge stream 92. So, as the electronic water sprinkler 42 irrigates one of the different yards, the colony 20 of sensors may change its ownership allegiance 60 based on the angular orientation 90 of the discharge stream 92 with respect to zero degrees. That is, the colony 20 of sensors may query the electronic allegiancy database (illustrated as reference numeral 70 in FIGS. 4-6) for the angular orientation 90 and retrieve the corresponding allegiance 60. So, when watering "Yard 1," the colony 20 of sensors may adopt the allegiance 60 associated with the owner of "Yard 1" and discharge according to the needs established for that quadrant or yard. However, when the angular orientation 90 causes a change in the allegiance 60, the colony 20 of sensors may change its allegiance 60 and irrigate to the different owner's desires. The colony 20 of sensors may monitor the water consumption associated each different owner (using the electronic flow meter 40 illustrated in FIG. 2), perhaps also based on the angular orientation 90. The single, shared electronic water sprinkler 42 may thus irrigate multiple properties, thus reducing the costs of installation and service. Moreover, the electronic flow meter 40 may allocate consumption to each different owner, thus fairly tracking each owner's water usage.

Figure 8:
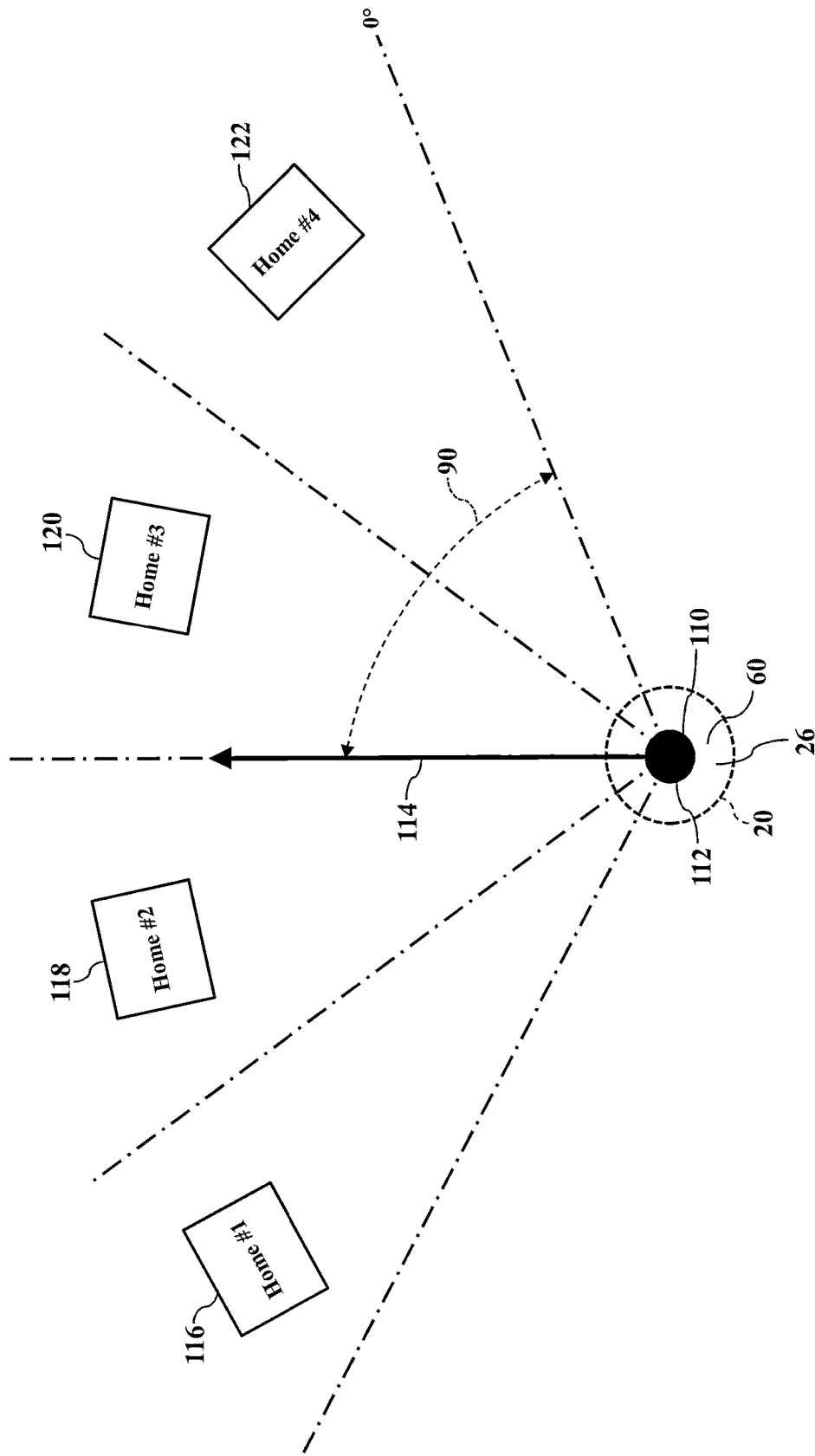

FIG. 8 also illustrates positional allegiance 60. Here the colony 20 of sensors provides shared security services to multiple homes. That is, suppose the colony 20 of sensors includes a single camera 110 that monitors the entry doors of different homes in a cul de sac. The camera 110 has a motorized base 112 that allows the camera 110 to change its field 114 of view. As the camera 110 moves or sweeps, the camera 110 generates video data of the different homes (illustrated, respectively, as reference numerals 116, 118, 120, and 122). The position sensor 26 again determines the radial or angular orientation 90 associated with the motorized base 112 and/or the corresponding field 114 of view. As the camera 110 aims its lens, the colony 20 of sensors may change its allegiance 60 based on the orientation 90 with respect to a nominal or reference position (such as zero degrees). Different homes, in other words, may be associated with different orientations 90 of the camera 110. The colony 20 of sensors may thus again query the electronic allegiancy database (illustrated as reference numeral 70 in FIGS. 4-6) for the orientation 90 and retrieve the corresponding allegiance 60. As the camera 110 rotates and changes its field 114 of view, exemplary embodiments may adopt the allegiance 60 associated with the corresponding orientation 90. The single, shared camera 110 may thus monitor multiple homes, thus reducing the costs of installation and service.

Figure 9:
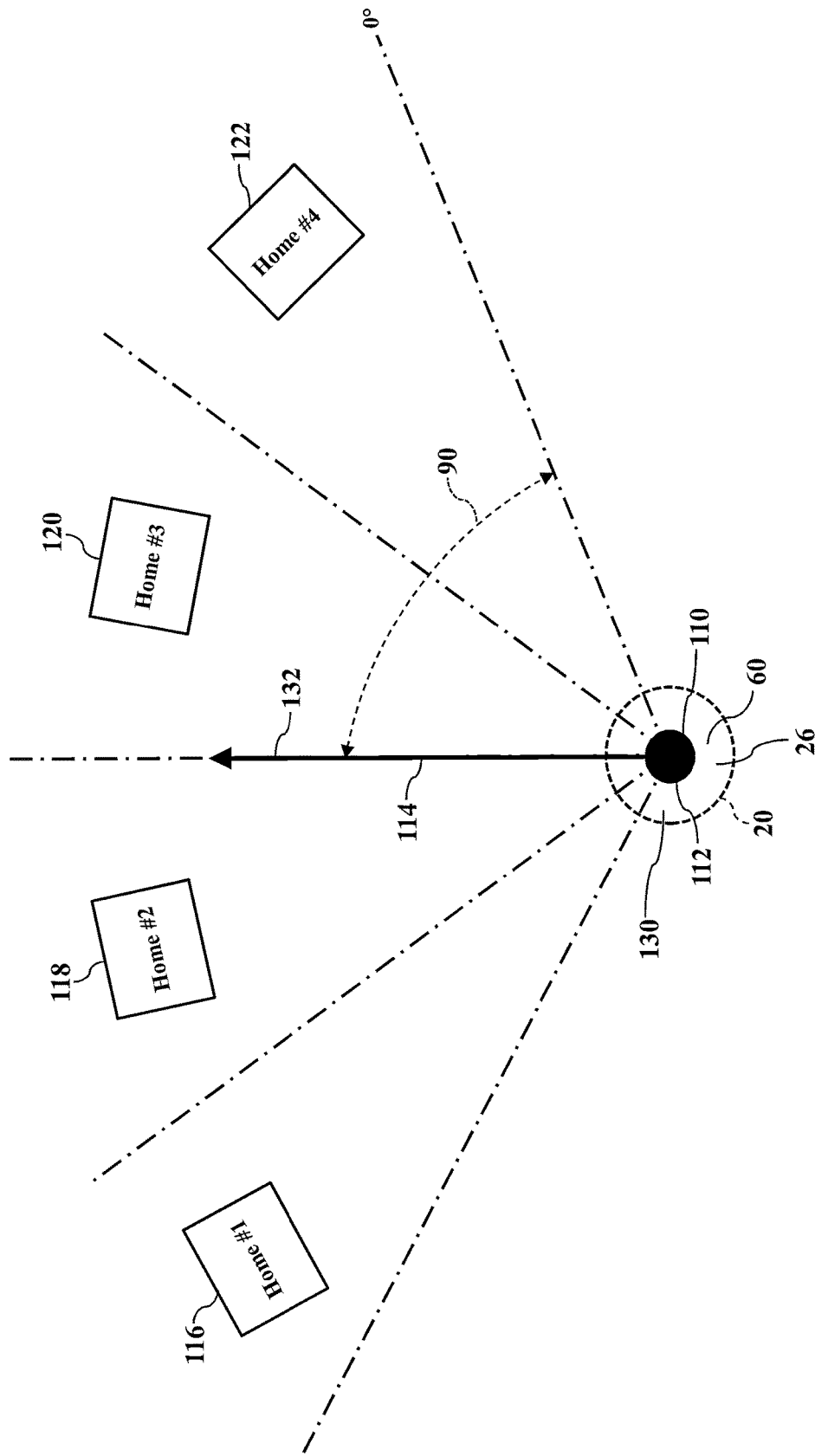

FIG. 9 further illustrates security allegiance 60. Here the colony 20 of sensors may provide additional, shared security services to the different homes (illustrated, respectively, as reference numerals 116, 118, 120, and 122) in the cul de sac. For example, the colony 20 of sensors may also include a directional microphone 130. If the directional microphone 130 shares the motorized base 112, then the directional microphone 130 may also be aimed or trained to each individual home in the cul de sac. As the motorized base 112 turns or rotates, the directional microphone 130 sweeps the homes and generates audible data along a corresponding audible field 132. Exemplary embodiments may thus generate video data (output by the video camera 110) and audio data (output by the microphone 130) that corresponds to the radial or angular orientation 90 associated with the motorized base 112. Exemplary embodiments may thus attribute the video data and the audio data to the positional allegiance 60 based on the orientation 90. Different homes, in other words, may be associated with different orientations 90 associated with the colony 20 of sensors. Once the orientation 90 is determined (perhaps with respect to a reference position zero or final degrees), the colony 20 of sensors may thus again query the electronic allegiancy database (illustrated as reference numeral 70 in FIGS. 4-6) for the orientation 90 and retrieve the corresponding allegiance 60. The shared colony 20 of sensors thus monitors multiple properties, thus reducing the costs of installation and service.

Exemplary embodiments thus present an elegant and cost-effective solution. The colony 20 of sensors collaborates to provide security and automation services. However, the colony 20 of sensors may also dynamically switch its allegiance 60 to service different users. The colony 20 of sensors, in simple words, may be transferrable. Any sensory functions may thus be transiently allied to different users, based on wireless detection and/or the orientation 90. Whenever the colony 20 of sensors changes its allegiance 60, billing mechanisms may accurately monitor the sensory functions to ensure fair billing structures according to the allegiance 60. Any installation and usage costs may thus be fairly apportioned.

Exemplary embodiments lend themselves to rental opportunities. Conventional sensory installations are often too expensive for widespread adoption. Here, though, exemplary embodiments may easily switch allegiance 60 with little or no backend effort and administrative processing. The colony 20 of sensors may thus be installed and rented according to the allegiance 60. That is, a billing structure may be developed based on the sensory services, according to the allegiance 60. Even micro-payments may be easily implemented in relation to the allegiance 60.

The colony 20 of sensors may be easily adapted. The colony 20 of sensors may be integrated with the single motorized base 112. That is, the single motorized base 112 provides a mounting platform to which the colony 20 of sensors may be attached. As the motorized base 112 spins or rotates, the colony 20 of sensors may unitarily change their allegiance 60, based on the radial or angular orientation 90 determined by the position sensor 26. Different allegiance 60 may also be assumed, based on the unique identity of a passing mobile device and/or the different orientations 90 of the motorized base 112. The colony 20 of sensors may thus be installed or mounted as a single unit to a mounting pole to provide shared surveillance. The colony 20 of sensors may thus be installed atop existing street signs, light poles, utility poles, and even rooftops for profiled monitoring according to the orientation 90.

Figure 10:
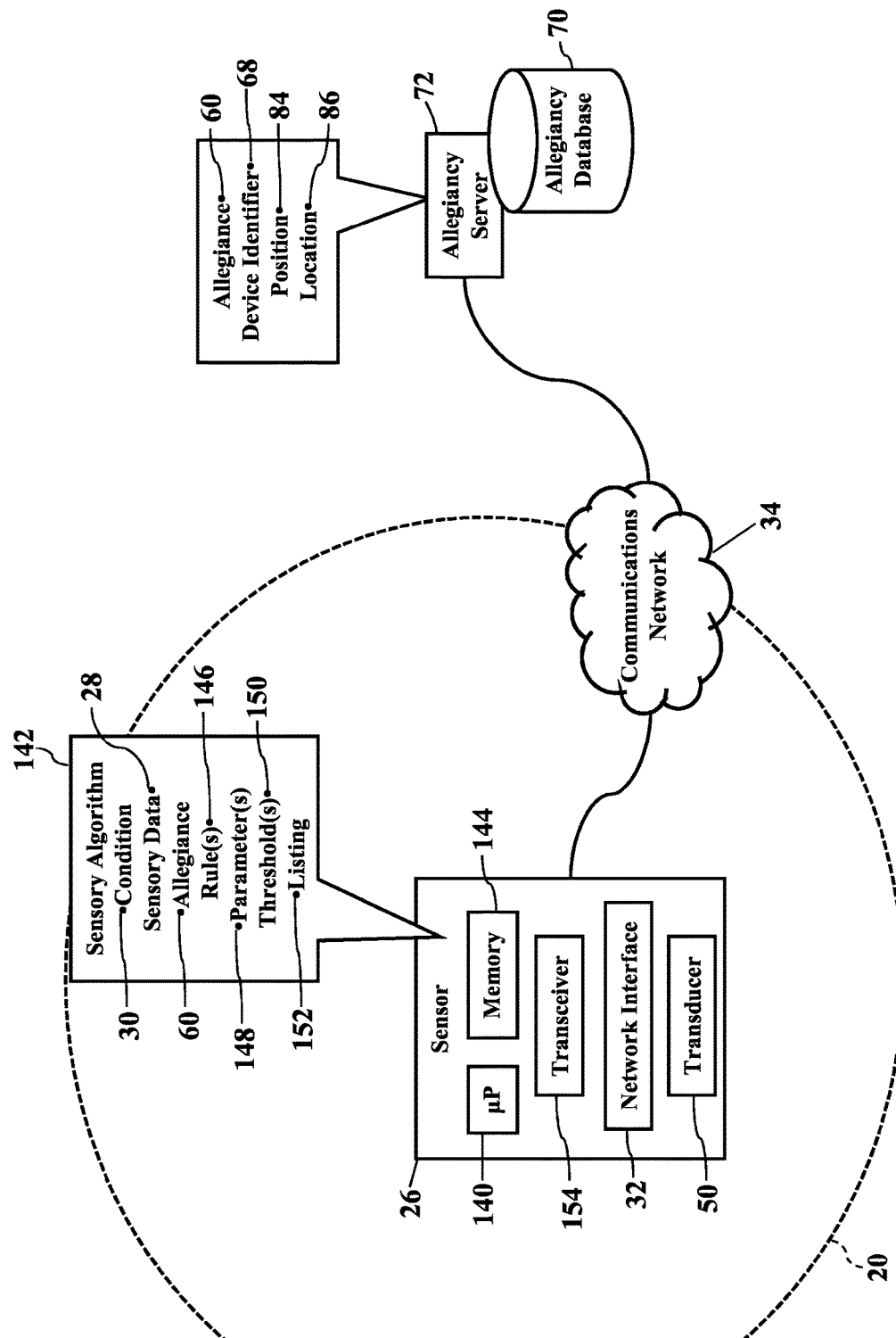
FIGS. 10-14 are more detailed illustrations of the operating environment, according to exemplary embodiments.

FIGS. 10-14 are more detailed illustrations of the operating environment, according to exemplary embodiments. FIG. 10 illustrates an individual smart sensor 26 associated with the colony 20 of sensors. The sensor 26 has a processor 140 (e.g., "μP"), application specific integrated circuit (ASIC), or other component that executes a sensory algorithm 142 stored in a memory 144. The sensory algorithm 142 instructs the processor 140 to perform operations, such as analyzing and processing the sensory data 28 generated by the transducer 50 when sensing the condition 30. The sensory algorithm 142 may cause the processor 140 to query the allegiancy database 70 to determine the allegiance 60. The sensory algorithm 142 may also cause the processor 140 to retrieve and execute any associated rules 146, operating parameters 148, and/or threshold values 150 having electronic database associations with the allegiance 60. The sensory algorithm 142 may also retrieve a listing 152 of network addresses to which the sensory data 28 is shared. The sensory algorithm 142 may thus instruct the processor 140 to send the sensory data 28 to any entry in the listing 152 of network addresses.

The sensor 26 may also include or access a transceiver 154. The sensor 26 may thus be capable of transmitting and/or receiving signals (such as broadcasting the communications network 34). The sensor 26 may call or invoke its network interface 32 to establish communication with the communications network 34. While the communications network 34 is preferably a wireless local area network, the communications network 34 may be a wired local area network and/or a cellular data network, as later paragraphs will explain.

Figure 11:
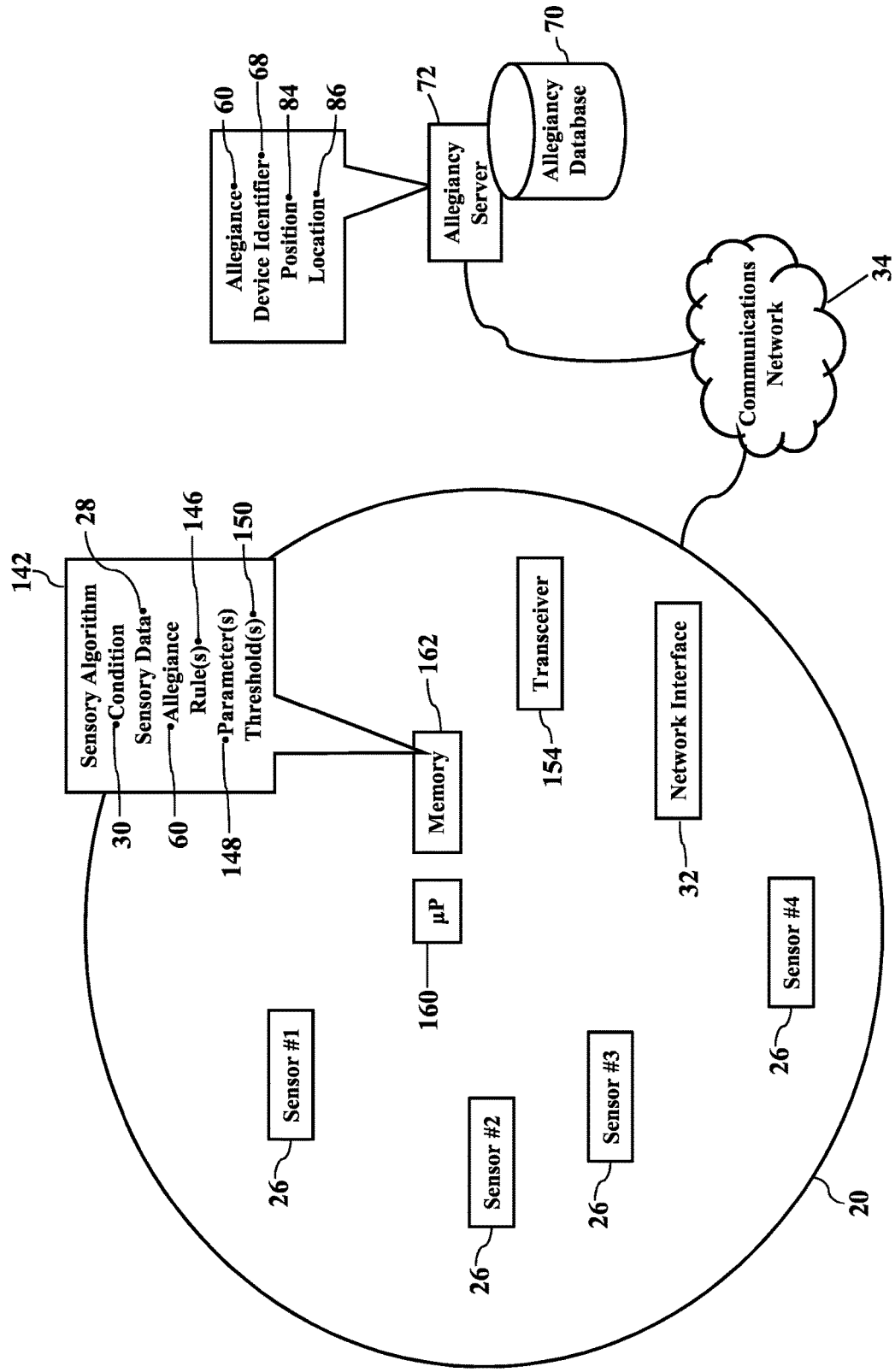

FIG. 11 illustrates the colony 20 of sensors. Here the colony 20 of sensors may have a central processor 160 (e.g., "ξP"), application specific integrated circuit (ASIC), or other component that executes the sensory algorithm 142 stored in a memory 162. The central processor 160 may interface with the different sensors 26 associated with the colony 20 of sensors. The sensory algorithm 142 instructs the central processor 160 to perform operations, such as establishing communication with the individual sensors 26 and receiving their respective sensory data 28. The sensory algorithm 142 may cause the central processor 160 to query the allegiancy database 70 to determine the allegiance 60. The sensory algorithm 142 may also cause the central processor 160 to retrieve and execute the rules 146, operating parameters 148, and/or threshold values 150 having electronic database associations with the allegiance 60.

Figure 12:
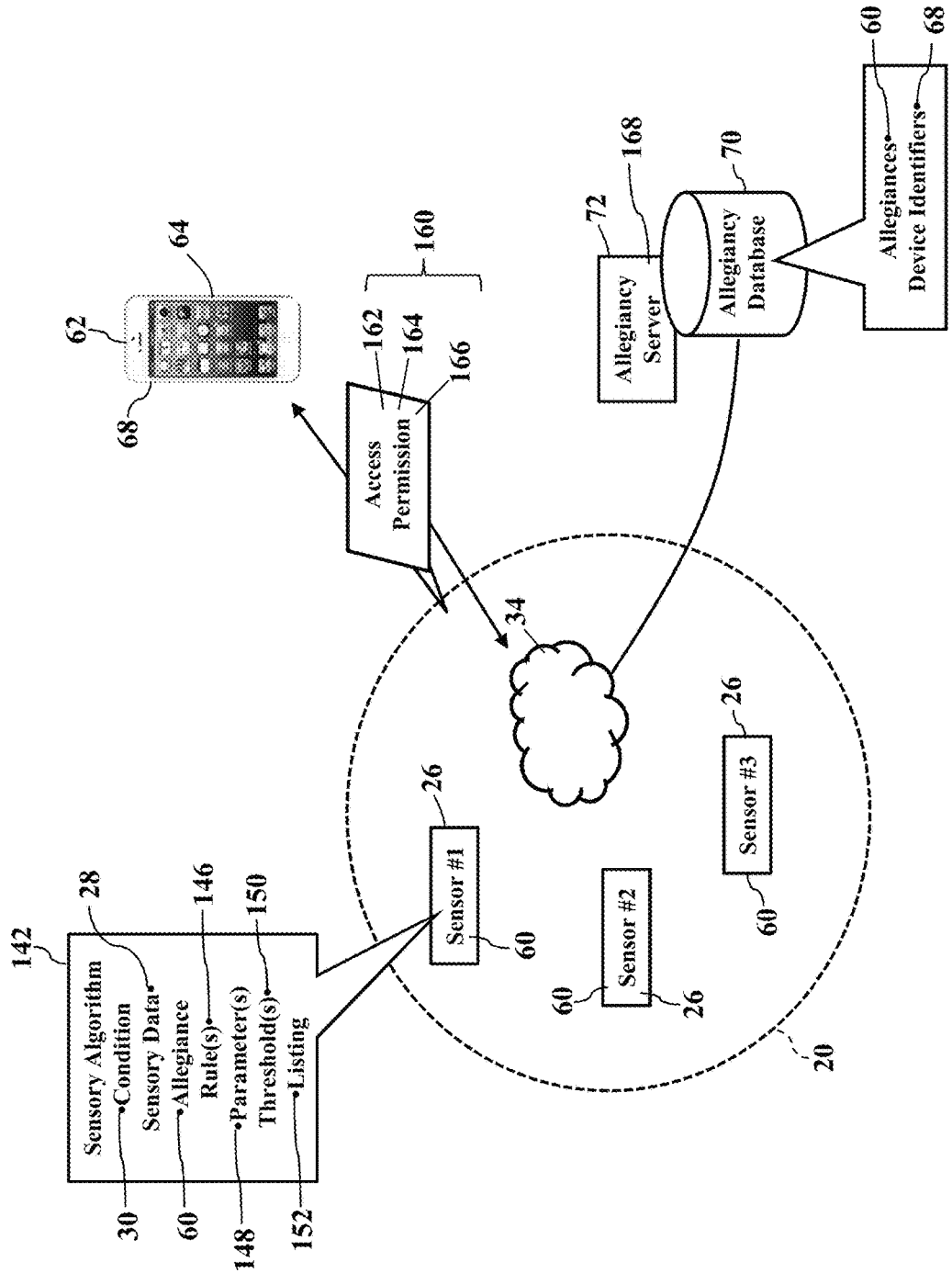

FIG. 12 illustrates device detection. Here any one or more of the sensors 26 in the colony 20 of sensors may establish communication with the mobile device 62 via the communications network 34. FIG. 12 illustrates the mobile device 62 as the user's smartphone 64. When the user's smartphone 64 detects the communications network 34, the smartphone 64 may request access permission, which is well known and need not be explained in detail. The smartphone 64 identifies itself, such as sending data representing the device identifier 68. While any alphanumeric combination may uniquely identify the smartphone 64, FIG. 12 illustrates a cellular identifier 160. The cellular identifier 160 may include or specify the smartphone's cellular telephone number (or "CTN") 162, International Mobile Subscriber Identity (or "IMSI") 164, or Mobile Station International Subscriber Directory Number ("MSISDN") 166. Whenever the mobile smartphone 64 sends messages or information, the smartphone 64 may include or self-report its CTN 162, IMSI 164, and/or its MSISDN 166.

The sensor 26 may then obtain the corresponding allegiance 60. Once the cellular identifier 160 is known, the sensor 26 may then query the allegiancy database 70 to determine the allegiance 60. The sensory algorithm 142 causes the sensor 26 to generate and send an electronic query to the network address 168 associated with the allegiancy server 72. The query may include data or information representing the device identifier 68 (such as the cellular identifier 160) as a search term. The allegiancy server 72 thus retrieves the allegiance 60 that corresponds to the device identifier 68.

Figure 13:
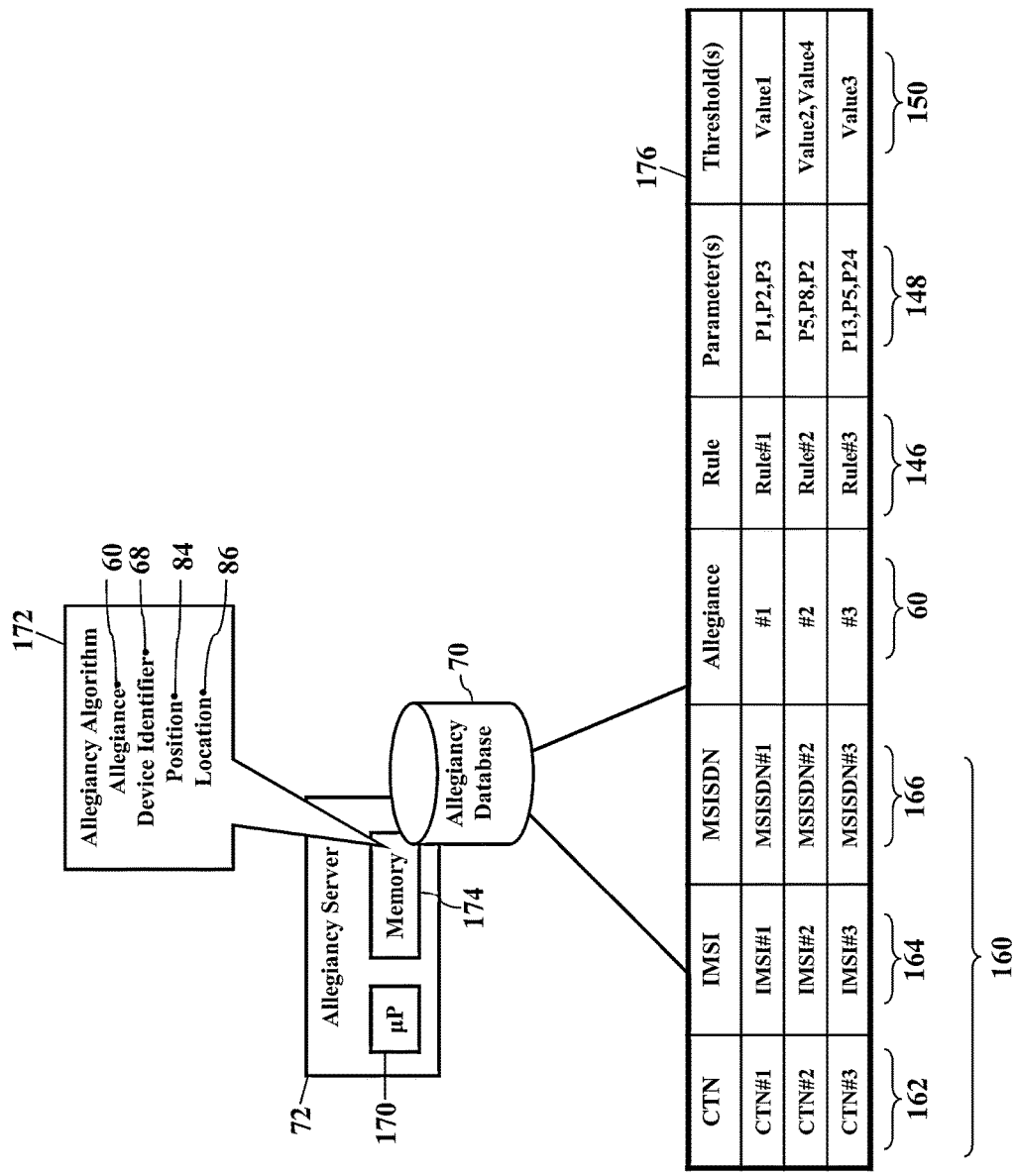

FIG. 13 illustrates the allegiancy server 72. The allegiancy server 72 has a processor 170 (e.g., "μP"), application specific integrated circuit (ASIC), or other component that executes an allegiancy algorithm 172 stored in a memory 174. The allegiancy algorithm 172 causes the processor 170 to query the electronic allegiancy database 70 for any query term. For simplicity the electronic allegiancy database 70 is illustrated as a table 176 that electronically maps, relates, or associates different query terms to their corresponding allegiance 60. For example, entries may associate different cellular identifiers 160 (e.g., the CTN 162, the IMSI 164, and/or the MSISDN 166) to their corresponding different allegiances 60. Any device, though, may be additionally or alternatively uniquely identified by a network address, a manufacturer's serial number, or any other alphanumeric combination. The electronic allegiancy database 70 is illustrated as being locally stored in the memory 174 of the allegiancy server 72, but some or all of the database entries may be remotely maintained at some other server or location in the communications network (illustrated as reference numeral 34 in FIGS. 1-6). While FIG. 13 only illustrates a few entries, in practice the electronic allegiancy database 70 may contain many entries for hundreds, thousands, or even millions of different allegiances 60.

The allegiancy server 72 queries to determine the allegiance 60. For example, the allegiancy server 72 may query for one or more entries that match the query search term(s) detailed or described in a query sent by the colony 20 of sensors. If the electronic allegiancy database 70 contains a matching entry, then the allegiancy server 72 may retrieve the matching entries. The allegiancy server 72 sends a query response to the network address associated with any sensor 26 associated with the colony 20 of sensors. The allegiancy algorithm 172 and the sensory algorithm 142 (illustrated in FIG. 12) may cooperate to provide personalized sensory services, based on the device identifier 38 associated with the user's smartphone 64. The allegiancy algorithm 172 may even retrieve the rules 146, operating parameters 148, and/or threshold values 150 having electronic database associations with the allegiance 60.

Figure 14:
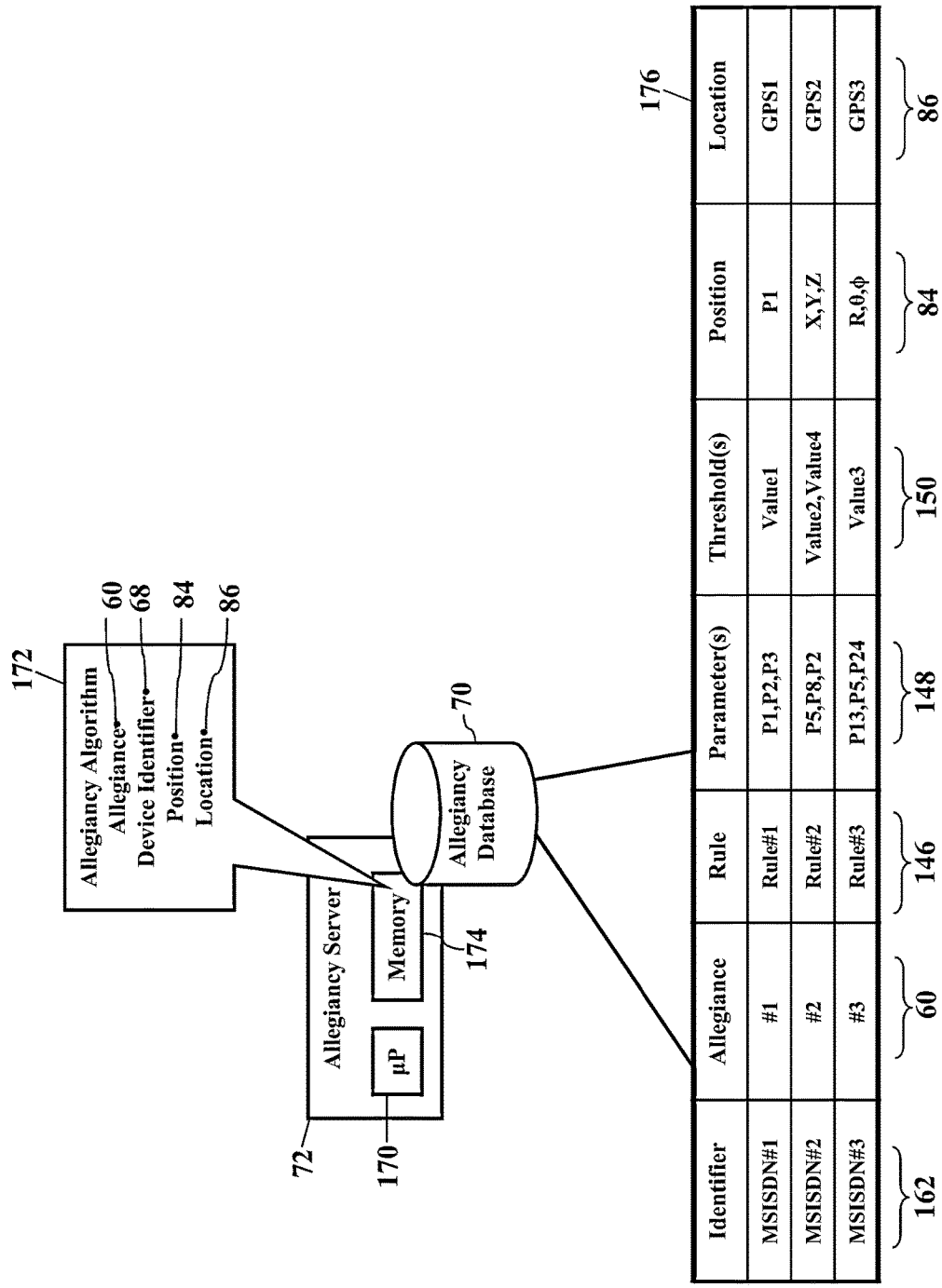

FIG. 14 further illustrates the electronic allegiancy database 70. Here the electronic allegiancy database 70 has additional database entries that electronically associate the allegiance 60 to its corresponding position 84 and location 86. As this disclosure explains, different allegiances 60 may be defined for different positions 84 and/or different locations 86. For example, the allegiance 60 may be determined based on the one, two, and/or three dimensional orientation 90 associated with the colony 20 of sensors (as explained with reference to FIGS. 6-9). The allegiance 60 may additionally or alternatively be determined based on the geographical location 86 associated with the colony 20 of sensors (as explained with reference to FIG. 6). However, as many mobile devices have GPS capabilities (such as the smartphone 64 illustrated in FIGS. 3-6), the allegiance 60 may also be additionally or alternatively determined based on the geographical location 86 associated with any GPS information associated with any device. So, once the allegiance 60 is determined, the allegiancy algorithm 172 may further retrieve the rules 146, operating parameters 148, and/or threshold values 150 having electronic database associations with the allegiance 60.

Figure 15:
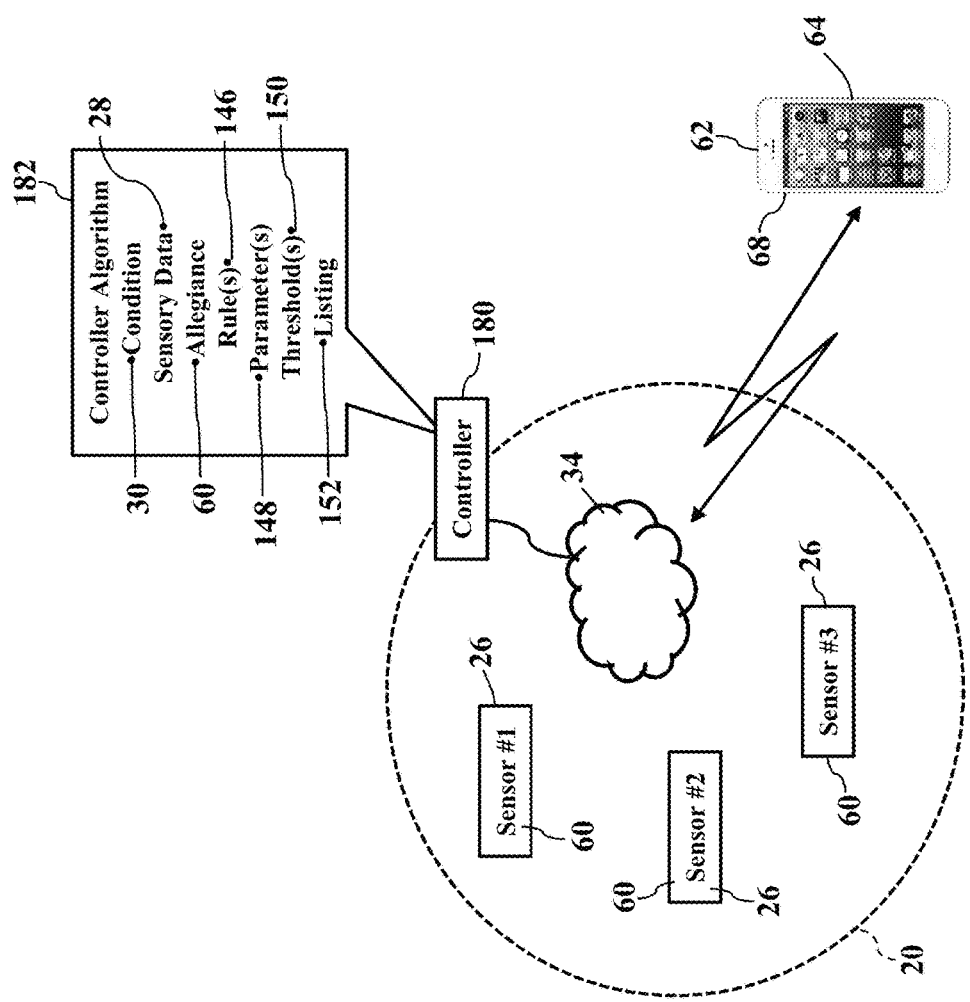
FIGS. 15-16 illustrate a controller, according to exemplary embodiments.
Figure 16:
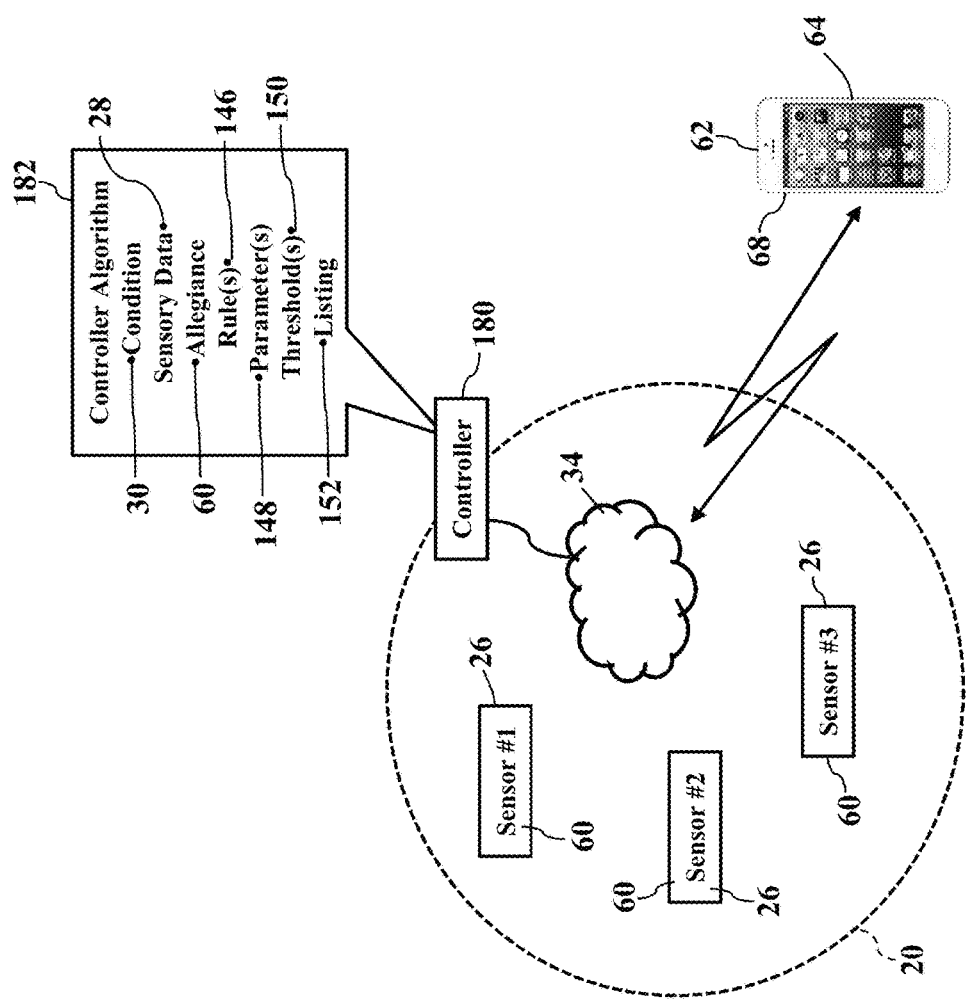

FIGS. 15-16 illustrate a controller 180, according to exemplary embodiments. Here the colony 20 of sensors may interface with the controller 180 to provide security and automation functions. Even though the colony 20 of sensors may be smart, processor-controlled devices, the colony 20 of sensors may still interface with the controller 180. The controller 180 may provide security functions and/or home automation functions. The controller 180 may thus have a processor and memory (not shown for simplicity) that stores and executes a controller algorithm 182. Any sensor 26 associated with the colony 20 of sensors may additionally or alternatively send its sensory data 28 via the communications network 34 to the network address associated with the controller 180. The sensor 26 may also send or include the device identifier 68 associated with the smartphone 64. When the controller 180 receives the sensory data 28, the controller algorithm 182 may cause the controller to query for the allegiance 60, as above explained. The controller algorithm 182 may also retrieve the rules 146, operating parameters 148, and/or threshold values 150 having electronic database associations with the allegiance 60.

FIG. 16 illustrates peer-to-peer paths. The controller 180 may itself detect the user's smartphone 64 and implement the corresponding allegiance 60. The controller 180, for example, may have an internal transceiver (not shown for simplicity) that broadcasts the wireless communications network 34 (such as a WI-FI® wireless local area network, a cellular network, and/or a BLUETOOTH® network). When the controller 180 and the smartphone 64 establish communication, their respective cellular identifiers 68 may be exchanged. The controller algorithm 182 may cause the controller 180 to query for the allegiance 60, as above explained. The controller algorithm 182 may also retrieve the rules 146, operating parameters 148, and/or threshold values 150 having electronic database associations with the allegiance 60. The controller algorithm 182 may thus configure for security and/or automation operation, according to the rules 146, operating parameters 148, and/or threshold values 150 associated with the allegiance 60.

Exemplary embodiments may packetize. The various network interfaces to the communications network 34 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 17:
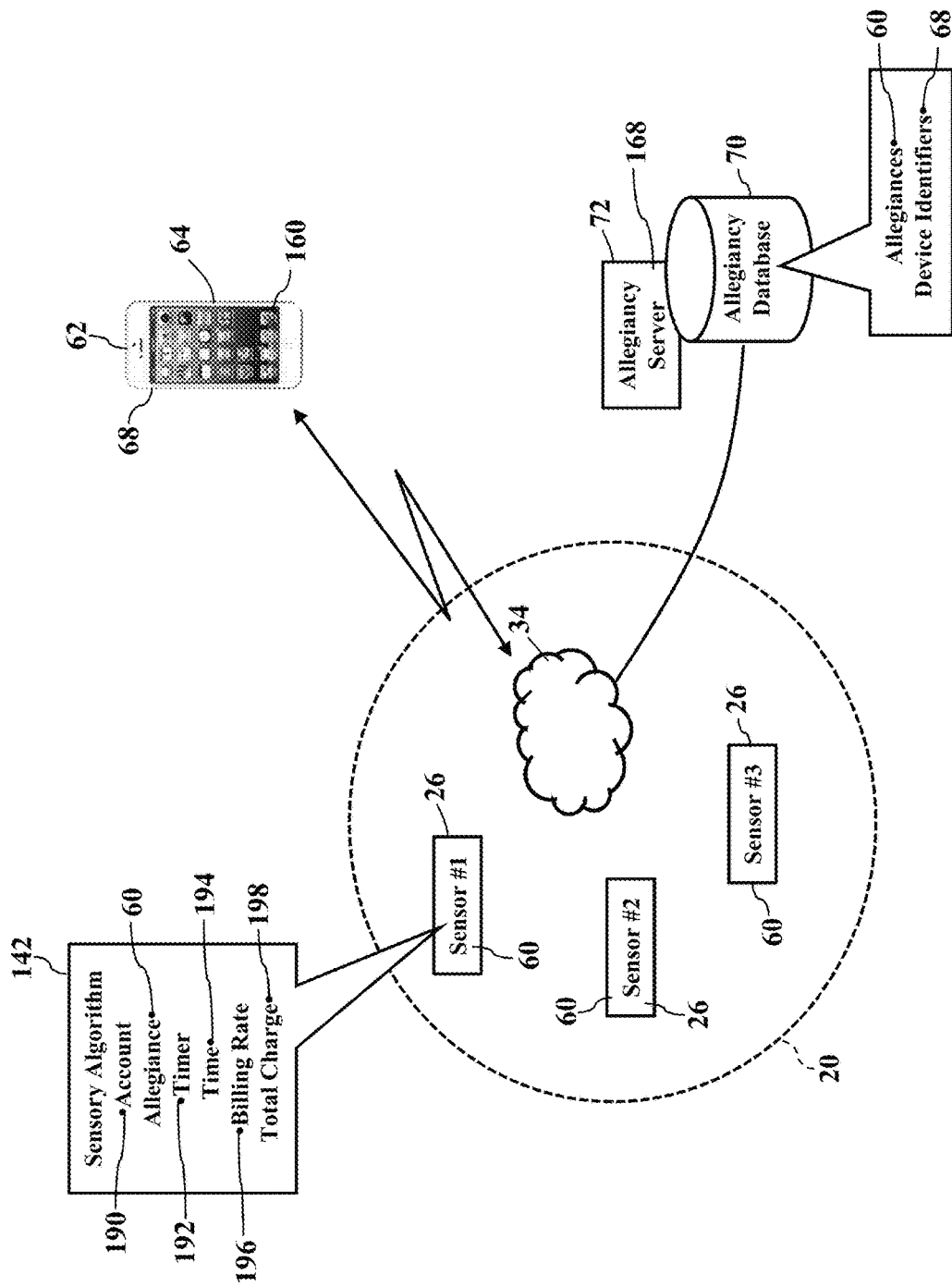
FIG. 17 illustrates a billing scheme, according to exemplary embodiments.

FIG. 17 illustrates a billing scheme, according to exemplary embodiments. Here an account 190 may be charged or billed for the allegiance 60. Once the allegiance 60 is determined (as above explained), personalized sensory services may be applied or performed (perhaps according to the device identifier 68, as also above explained). For example, exemplary embodiments may bill the user's smartphone 64 for the personalized sensory services. Once the allegiance 60 is determined, exemplary embodiments may initialize a timer 192. The timer 192 may start counting or incrementing from an initial value (zero) at which the personalized sensory services begin. As the personalized sensory services commence and progress, the timer increments. At some point the personalized sensory services stop or halt, at which the timer 192 stops counting at its final value. The personalized sensory services may end when some software routine completes and/or when a different allegiance 60 is determined (e.g., a different cellular identifier 160 is detected). Exemplary embodiments thus determine a time 194 associated with the personalized sensory service. As FIG. 17 also illustrates, a billing rate 196 may then be applied to the time 194 of the personalized sensory service to determine a total charge 198. The account 190 may then be billed for the total charge 198.

Exemplary embodiments thus present an elegant and cost-effective solution. The colony 20 of sensors may dynamically switch its allegiance 60 to service different users. Their allegiance 60, in simple words, may fairly transfer between different billing entities, based on wireless detection of the device identifier 668, the position 84, and/or the location 86. Whenever the colony 20 of sensors changes allegiance 60, exemplary embodiments accurately monitor the sensory functions to ensure fair billing structures. Any installation and usage costs may thus be fairly apportioned.

Figure 18:
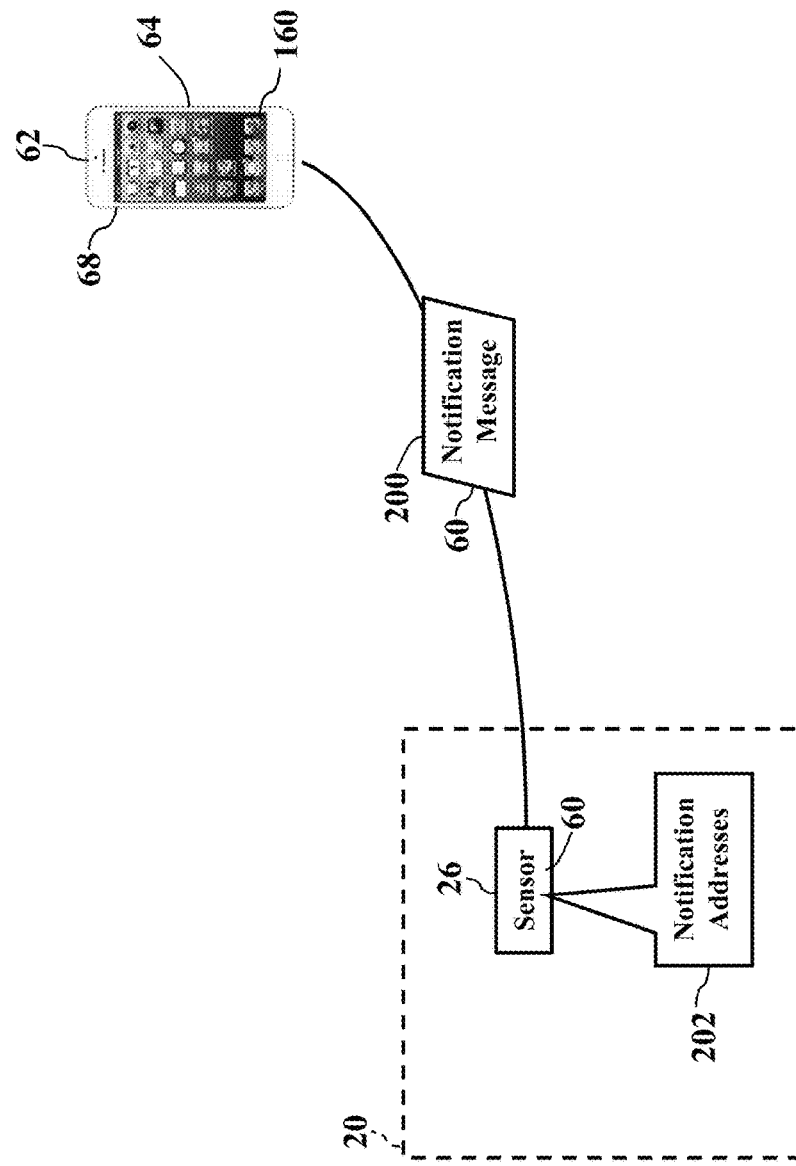
FIG. 18 illustrates allegiancy notifications, according to exemplary embodiments.

FIG. 18 illustrates allegiancy notifications, according to exemplary embodiments. Any time the colony 20 of sensors provides some sensory service, an electronic notification may be sent. FIG. 18, for example, illustrates an electronic message 200 being sent to the user's smartphone 64. Any time the colony 20 of sensors allies itself to the user's smartphone 64, exemplary embodiments may generate a send the electronic message 200 to the device identifier 68 (such as the cellular identifier 160) or any other notification addresses 202 associated with the allegiance 60. Exemplary embodiments may thus notify users, occupants, family members, and/or friends with text messages, emails, social postings, and web page links. The electronic message 200 preferable explains the personalized sensory service and any charges.

Figure 19:
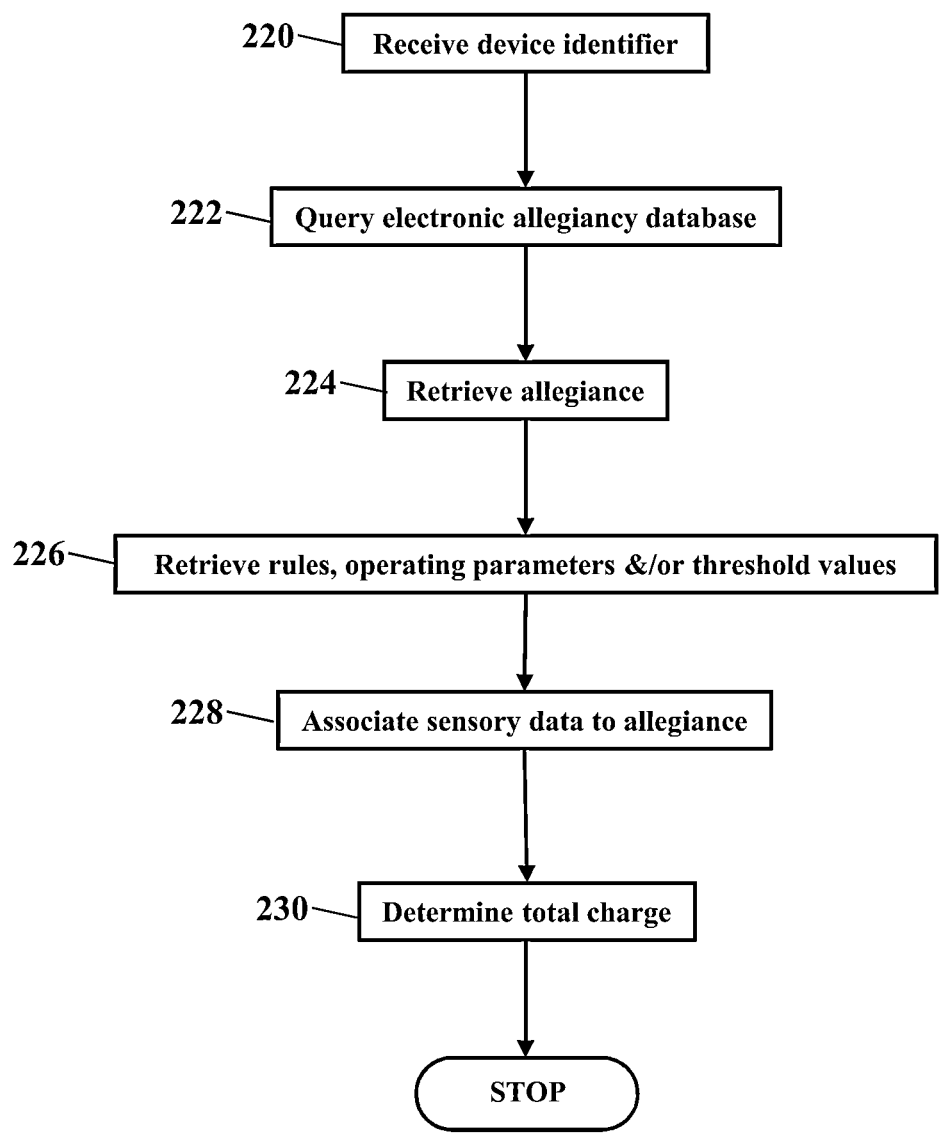
FIG. 19 is a flowchart illustrating a method or algorithm for personalized sensory services, according to exemplary embodiments.

FIG. 19 is a flowchart illustrating a method or algorithm for personalized sensory services, according to exemplary embodiments. The device identifier 68 is received (Block 220). The electronic allegiancy database 70 is queried for the device identifier 68 (Block 222). The allegiance 60 is retrieved (Block 224), along with the rules 146, operating parameters 148, and/or threshold values 150 associated with the allegiance 60 (Block 226). The sensory data 28 may be associated with the allegiance 60 (Block 228). The total charge 198 is determined (Block 230).

Figure 20:
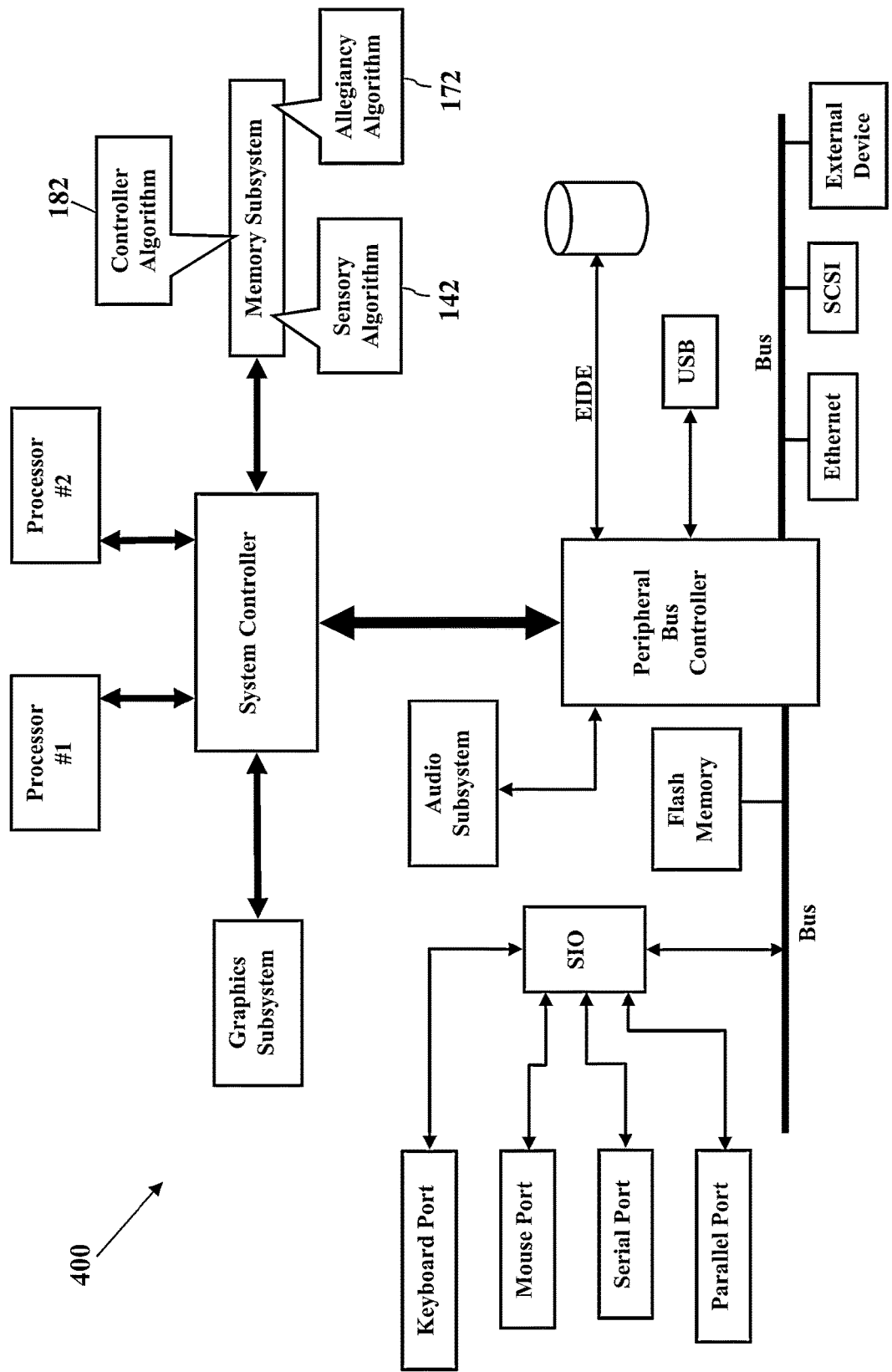
FIGS. 20-25 depict still more operating environments for additional aspects of the exemplary embodiments.

FIG. 20 is a schematic illustrating still more exemplary embodiments. FIG. 20 is a more detailed diagram illustrating a processor-controlled device 400. As earlier paragraphs explained, the sensory algorithm 142, the allegiancy algorithm 172, and/or the controller algorithm 182 may partially or entirely operate in any mobile or stationary processor-controlled device. FIG. 20, then, illustrates the sensory algorithm 142, the allegiancy algorithm 172, and/or the controller algorithm 182 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 21:
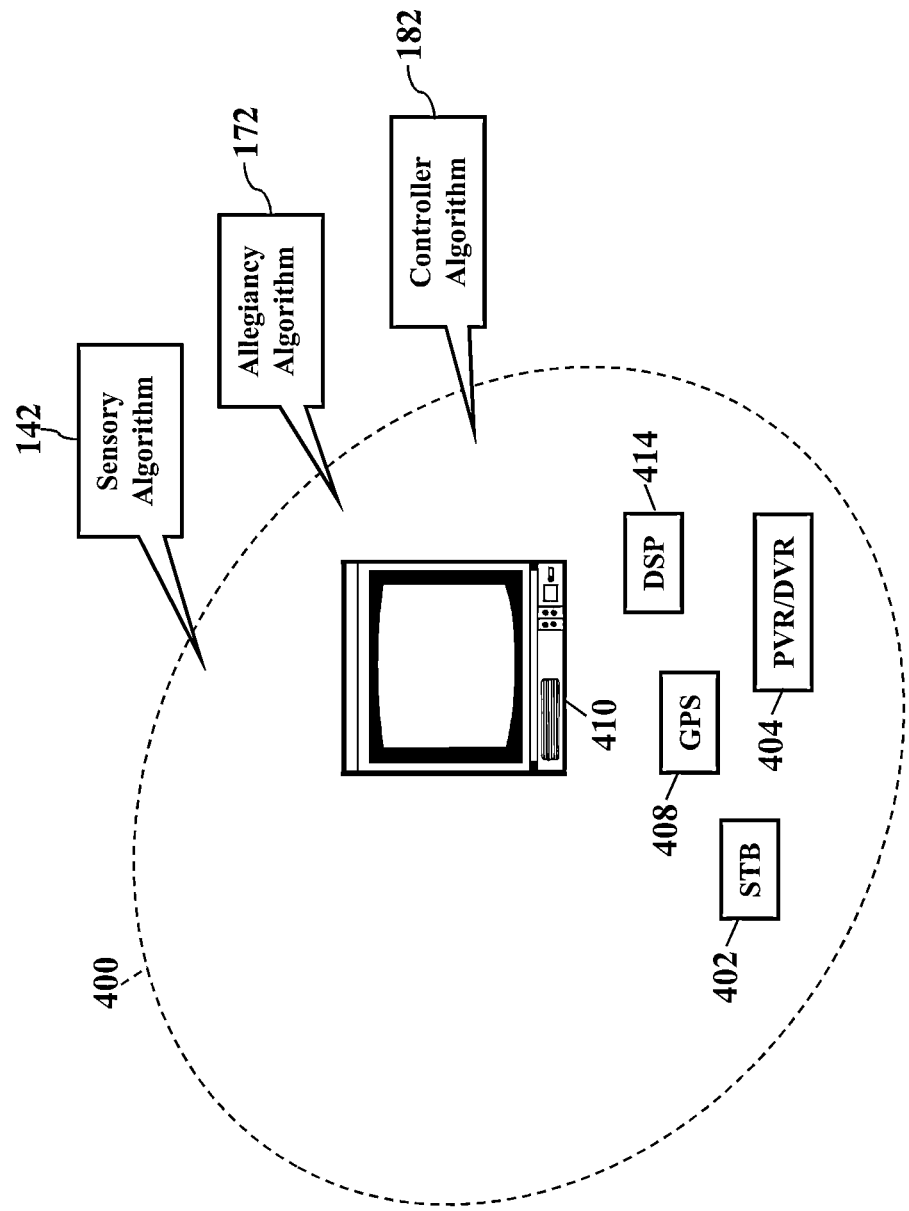

FIG. 21 depicts other possible operating environments for additional aspects of the exemplary embodiments. FIG. 21 illustrates the sensory algorithm 142, the allegiancy algorithm 172, and/or the controller algorithm 182 operating within various other processor-controlled devices 400. FIG. 21, for example, illustrates that the sensory algorithm 142, the allegiancy algorithm 172, and/or the controller algorithm 182 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 22:
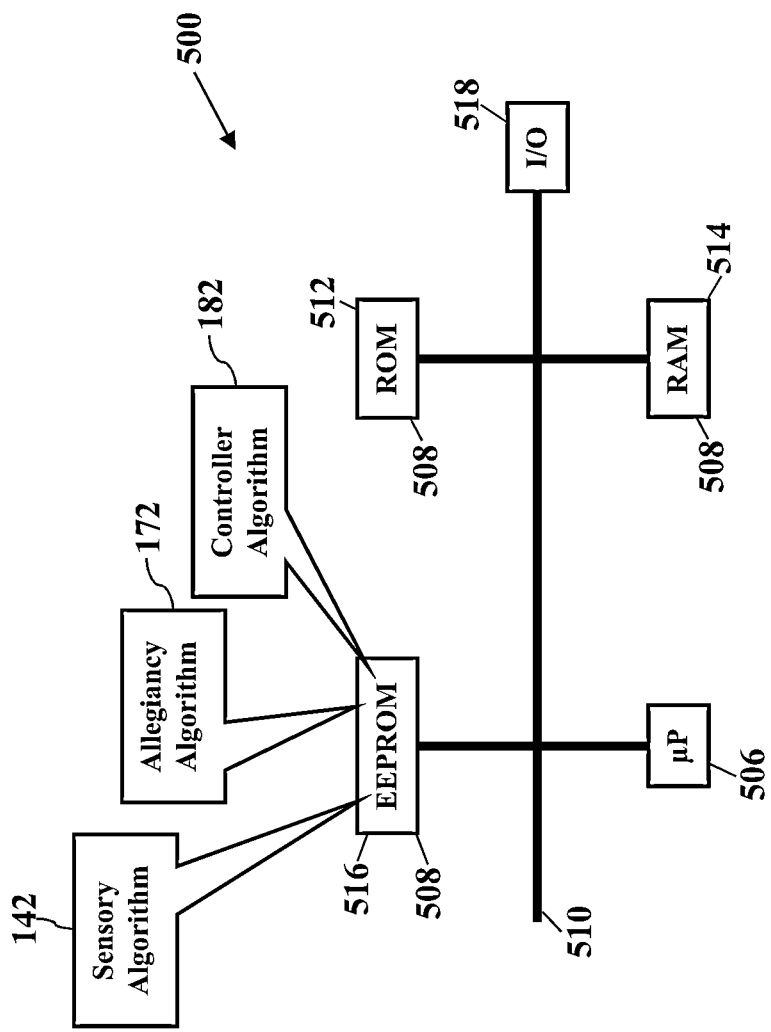
Figure 23:
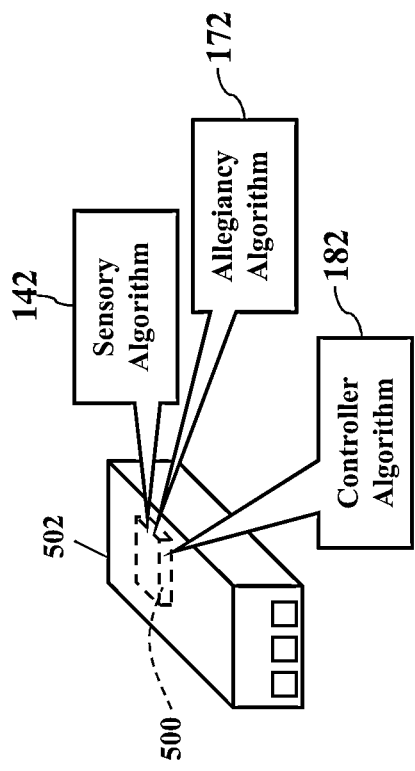
Figure 24:
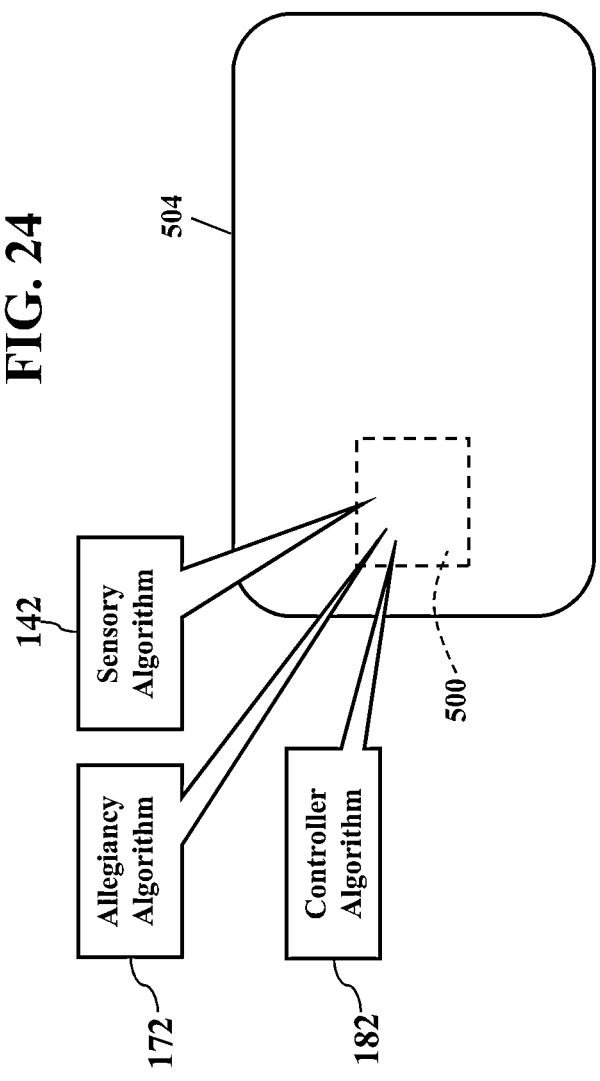

FIGS. 22-25 are schematics further illustrating operating environments for additional aspects of the exemplary embodiments. FIG. 22 is a block diagram of a Subscriber Identity Module 500, while FIGS. 23-24 illustrate, respectively, the Subscriber Identity Module 500 embodied in a plug 502 and in a card 504. As those of ordinary skill in the art recognize, the Subscriber Identity Module 500 may be used in conjunction with many communications devices (such as the mobile smartphone 64). The Subscriber Identity Module 500 stores user information (such as the user's International Mobile Subscriber Identity, the user's $K_i$ number, and other user information) and any portion of the sensory algorithm 142, the allegiancy algorithm 172, and/or the controller algorithm 182. As those of ordinary skill in the art also recognize, the plug 502 and the card 504 each may physically or wirelessly interface with the mobile tablet computer 26 and the smartphone 412.

FIG. 22 is a block diagram of the Subscriber Identity Module 500, whether embodied as the plug 502 of FIG. 23 or as the card 504 of FIG. 24. Here the Subscriber Identity Module 500 comprises a microprocessor 506 (µP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the sensory algorithm 142, the allegiancy algorithm 172, and/or the controller algorithm 182 in one or more of the memory modules 508. FIG. 22 shows the sensory algorithm 142, the allegiancy algorithm 172, and/or the controller algorithm 182 residing in the Erasable-Programmable Read Only Memory 516, yet either module may alternatively or additionally reside in the Read Only Memory 512 and/or the Random Access/Flash Memory 514. An Input/Output module 518 handles communication between the Subscriber Identity Module 500 and the communications device. Because Subscriber Identity Modules are well known in the art, this patent will not further discuss the operation and the physical/memory structure of the Subscriber Identity Module 500.

Figure 25:
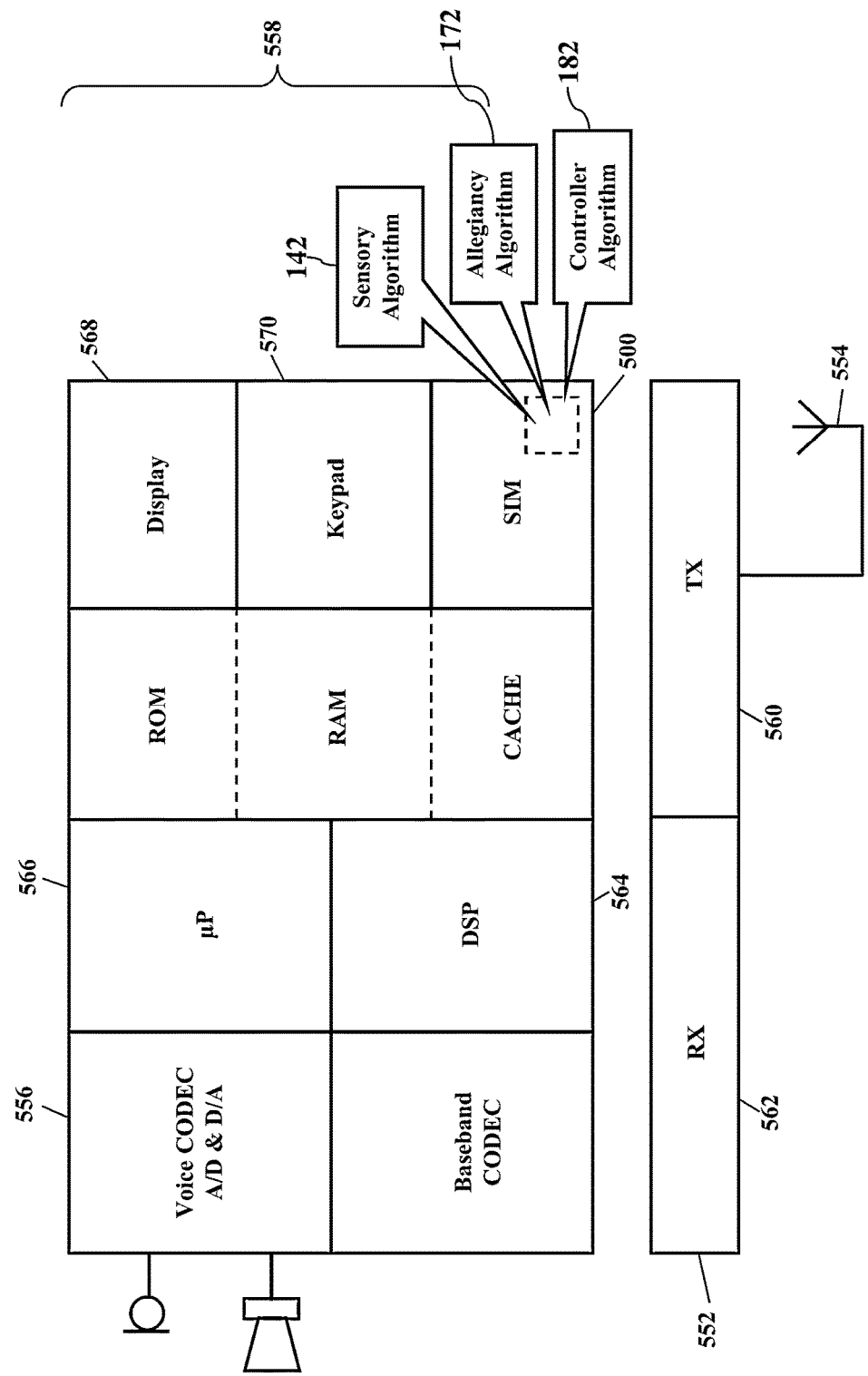

FIG. 25 is a schematic further illustrating the operating environment, according to exemplary embodiments. FIG. 25 is a block diagram illustrating some componentry of the sensor 26, the mobile device 62, and the allegiancy server 72. The componentry may include one or more radio transceiver units 552, an antenna 554, a digital baseband chipset 556, and a man/machine interface (MMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chip set 556 contains a digital signal processor (DSP) 564 and performs signal processing functions for audio (voice) signals and RF signals. As FIG. 25 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the controller algorithm 172 and/or the software application 116.

Exemplary embodiments may be applied to any signaling standard. As those of ordinary skill in the art recognize, FIGS. 22-25 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for personalized sensory services, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a hardware processor, a device identifier sent from a sensor, the device identifier uniquely identifying a processor-controlled device communicating with the sensor;
receiving, by the hardware processor, an angular orientation associated with the sensor, wherein the sensor is configured to rotate amongst a plurality of different angular orientations, the angular orientation included in the plurality of different angular orientations, wherein each of the plurality of different angular orientations is associated with a respective angular orientation of an irrigation device;
based on the device identifier and the angular orientation, determining, by the hardware processor, an allegiance between the processor-controlled device and the sensor; and
in response to the allegiance between the processor-controlled device and the sensor, associating, by the hardware processor, an output generated by the irrigation device to the processor-controlled device as part of a shared irrigation service for a subscriber included in a plurality of subscribers.

2. The method of claim 1, further comprising:
associating, by the hardware processor, the output to the device identifier.

3. The method of claim 1, further comprising:
receiving, by the hardware processor, the output.

4. The method of claim 1, wherein the receiving of the device identifier further comprises receiving the device identifier sent from a camera that communicates with the processor-controlled device.

5. The method of claim 4, further comprising:
identifying, by the hardware processor, the allegiance based on the camera that communicates with the processor-controlled device.

6. The method of claim 1, further comprising:
determining, by the hardware processor, a position associated with the sensor.

7. The method of claim 6, further comprising:
identifying, by the hardware processor, the allegiance between the processor-controlled device and the sensor based on the position.

8. A system, comprising:
a hardware processor; and
a memory device, the memory device storing instructions, the instructions when executed causing the hardware processor to perform operations, the operations comprising:
receiving a device identifier, the device identifier uniquely identifying a mobile device communicating with a sensor;
receiving an angular orientation associated with the sensor, wherein the sensor is configured to rotate amongst a plurality of different angular orientations, the angular orientation included in the plurality of different angular orientations, wherein each of the plurality of different angular orientations is associated with a respective angular orientation of an irrigation device;
based on the device identifier and the angular orientation, determining an allegiance between the mobile device and the sensor; and
in response to the allegiance between the mobile device and the sensor, associating an output generated by the irrigation device to the mobile device as part of a shared irrigation service.

9. The system of claim 8, wherein the operations further comprise:
associating the output to the device identifier.

10. The system of claim 8, wherein the operations further comprise:
receiving the output.

11. The system of claim 8, wherein the operations further comprise:
receiving the device identifier sent from a camera that communicates with the mobile device.

12. The system of claim 11, wherein the operations further comprise:
identifying the allegiance based on the camera that communicates with the mobile device.

13. The system of claim 8, wherein the operations further comprise:
determining a position associated with the sensor.

14. The system of claim 13, wherein the operations further comprise:
identifying the allegiance between the mobile device and the sensor based on the position.

15. A memory device storing instructions that when executed cause a hardware processor to perform operations, the operations comprising:
receiving a device identifier sent from a sensor, the device identifier uniquely identifying a mobile device communicating with the sensor;
receiving an angular orientation associated with the sensor, wherein the sensor is configured to rotate amongst a plurality of different angular orientations, the angular orientation included in the plurality of different angular orientations, wherein each of the plurality of different angular orientations is associated with a respective angular orientation of an electronic water sprinkler;
based on the device identifier and the angular orientation, determining an allegiance between the mobile device and the sensor; and
in response to the allegiance between the mobile device and the sensor, associating an output generated by the electronic water sprinkler to the mobile device as part of a shared watering service.

16. The memory device of claim 15, wherein the operations further comprise:
associating the output to the device identifier.

17. The memory device of claim 15, wherein the operations further comprise:
receiving the output.

18. The memory device of claim 15, wherein the operations further comprise:
receiving the device identifier sent from a camera that communicates with the mobile device.

19. The memory device of claim 18, wherein the operations further comprise:
identifying the allegiance based on the camera that communicates with the mobile device.

20. The memory device of claim 15, wherein the sensor includes an electronic flow meter that measures water discharged by the electronic water sprinkler.

\* \* \* \* \*